(12) United States Patent
Hunt et al.

(10) Patent No.: US 7,482,794 B2
(45) Date of Patent: Jan. 27, 2009

(54) SYSTEM, METHOD AND APPARATUS FOR CONTROLLING CONVERTERS USING INPUT-OUTPUT LINEARIZATION

(75) Inventors: Louis R. Hunt, Plano, TX (US); Robert J. Taylor, Garland, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 428 days.

(21) Appl. No.: 11/039,167

(22) Filed: Jan. 20, 2005

(65) Prior Publication Data

US 2006/0158910 A1 Jul. 20, 2006

(51) Int. Cl.
*G05F 1/40* (2006.01)

(52) U.S. Cl. .......................... 323/284; 323/283; 363/89

(58) Field of Classification Search ................. 323/222, 323/224, 282–285; 363/44–46, 87, 89, 84, 363/98
See application file for complete search history.

(56) References Cited

U.S. PATENT DOCUMENTS

| | | | |
|---|---|---|---|
| 5,138,250 A * | 8/1992 | Capel | ......................... 323/283 |
| 5,708,433 A | 1/1998 | Craven | |
| 5,804,950 A | 9/1998 | Hwang et al. | |
| 5,886,586 A | 3/1999 | Lai et al. | |
| 5,943,224 A | 8/1999 | Mao | |
| 6,084,450 A | 7/2000 | Smith et al. | |
| 6,538,905 B2 | 3/2003 | Greenfield et al. | |
| 6,545,887 B2 | 4/2003 | Smedley et al. | |
| 6,674,272 B2 * | 1/2004 | Hwang | ......................... 323/284 |

OTHER PUBLICATIONS

Hunt, L. R., et al., "Global transformations of nonlinear systems," IEEE Transactions on Automatic Control, 28 (1983), 24-31.
Sable, Dan M., et al., "Elimination of the positive zero in fixed frequency boost and flyback converters," Proceedings of 5th IEEE Applied Power Electronics Conference, (1990), 205-211.
Taylor, Robert J., "Feedback Linearization of Fixed Frequency PWM Converters," Ph.D. Dissertation, University of Texas at Dallas, published Nov. 2005.

* cited by examiner

*Primary Examiner*—Rajnikant B Patel
(74) *Attorney, Agent, or Firm*—Edwin S. Flores; Daniel J. Chalker; Chalker Flores, LLP

(57) ABSTRACT

The present invention provides a system, method and apparatus for controlling any type of converter using input-output linearization and leading-edge modulation. The controller includes a summing circuit connected to the converter to create a third voltage representing a difference between the first voltage and the second voltage. A gain circuit is connected to the summing circuit to adjust the third voltage by a proportional gain. A modulating circuit is connected to the gain circuit, the converter, the second voltage and the second current to create a control signal based on the second voltage, the adjusted third voltage, the first current and the second current. The control signal is used to control the converter. Typically, the first voltage is an output voltage from the converter, the second voltage is a reference voltage, the first current is an inductor current from the converter and the second current is a reference current.

17 Claims, 12 Drawing Sheets

SYSTEM, METHOD AND APPARATUS FOR CONTROLLING CONVERTERS USING INPUT-OUTPUT LINEARIZATION

FIELD OF THE INVENTION

The present invention relates generally to providing modulation signals to electrical circuits and, more particularly, to a system, method and apparatus for controlling converters using input-output linearization and leading-edge modulation.

BACKGROUND OF THE INVENTION

Power converters are used to convert one form of energy to another (e.g., AC to AC, AC to DC, DC to AC, and DC to DC) thereby making it usable to the end equipment, such as computers, automobiles, electronics, telecommunications, space systems and satellites, and motors. Every application of power electronics involves some aspect of control. Converters are typically identified by their capability and/or configurations, such as, buck converters, boost converters, buck-boost converters, boost-buck converters (Ćuk), etc. For example, DC-DC converters belong to a family of converters known as "switching converters" or "switching regulators." This family of converters is the most efficient because the conversion elements switch from one state to another, rather than needlessly dissipating power during the conversion process. Essentially there is a circuit with switches and two configurations (each can be modeled as linear systems) in which the converter resides according to the switch positions. The duty ratio (d) is the ratio indicating the time in which a chosen switch is in the "on" position while the other switch is in the "off" position, and this d is considered to be the control input. Input d is usually driven by pulse-width-modulation (PWM) techniques.

Switching from one state to another and the accompanying nonlinearity of the system causes problems. State space averaging reduces the switching problems to make the system, in general, a nonlinear averaged system. But, control of the system under these nonlinear effects becomes difficult when certain performance objectives must be met. For the most part linearization is done through a Taylor series expansion. Nonlinear terms of higher orders are thrown away and a linear approximation replaces the nonlinear system. This linearization method has proven effective for stabilizing control loops at a specific operating point. However, use of this method requires making several assumptions, one of them being so-called "small signal operation." This works well for asymptotic stability in the neighborhood of the operating point, but ignores large signal effects which can result in nonlinear operation of the control loop when, for example, an amplifier saturates during startup, or during transient modes, such as load or input voltage changes. Once nonlinear operation sets in, the control loop can have equilibrium points unaccounted for in the linearization.

One of the most widely used methods of pulse-width modulation is trailing-edge modulation (TEM), wherein the on-time pulse begins on the clock and terminates in accordance with a control law. Unstable zero dynamics associated with TEM in the continuous conduction mode (CCM) prevent the use of an input-output feedback linearization because it would result in an unstable operating point. The other control method is leading-edge modulation (LEM), wherein the on-time pulse begins in accordance with a control law and terminates on the clock. The difference between LEM and TEM is that in TEM the pulse-width is determined by the instantaneous control voltage $v_c$ prior to switch turn-off, whereas in LEM the pulse-width is determined by $v_c$ prior to switch turn-on.

There is, therefore, a need for a system, method and apparatus for controlling converters using input-output linearization that does not constrain stability to one operating point, but rather to a set of operating points spanning the expected range of operation during startup and transient modes of operation.

SUMMARY OF THE INVENTION

The present invention provides a system, method and apparatus for controlling converters using input-output linearization that does not constrain stability to one operating point, but rather to a set of operating points spanning the expected range of operation during startup and transient modes of operation. In particular, the present invention uses leading edge modulation and input output linearization to compute the duty ratio of a boost converter or a buck-boost converter. The present invention can also be applied to other converter types. Moreover, the parameters in this control system are programmable, and hence the algorithm can be easily implemented on a DSP or in silicon, such as an ASIC.

Notably, the present invention provides at least four advantages compared to the dominant techniques currently in use for power converters. The combination of leading-edge modulation and input-output linearization provides a linear system instead of a nonlinear system. In addition, the "zero dynamics" becomes stable because the zeros are in the left half plane instead of the right half plane. The present invention is also independent of stabilizing gain, as well as desired output voltage or desired output trajectory.

More specifically, the present invention provides a system that includes a converter having a first voltage and a first current, a second voltage source, a second current source, and a PWM modulator/controller. The PWM modulator/controller includes a summing circuit connected to the converter and the second voltage source to create a third voltage representing a difference between the first voltage and the second voltage. A gain circuit is connected to the summing circuit to adjust the third voltage by a proportional gain. A modulating circuit is connected to the gain circuit, the converter, the second voltage and the second current source to create a control signal based on the second voltage, the adjusted third voltage, the first current and the second current. The control signal is then used to control the converter.

Note that the second voltage source and second current source can be integrated into the PWM modulator/controller. In addition, the PWM modulator/controller can be implemented using a digital signal processor or conventional electrical circuitry. Typically, the first voltage is an output voltage from the converter, the second voltage is a reference voltage, the first current is an inductor current from the converter and the second current is a reference current. The control signal of the present invention can be used to control a boost converter, a buck-boost converter or other type of converter In addition, the present invention provides a modulator/controller that includes a summing circuit, a gain circuit, a modulating circuit and various connections. The connections include a first connection to receive a first voltage, a second connection to receive a second voltage, a third connection to receive a first current, a fourth connection to receive a second current, and a fifth connection to output a control signal. The summing circuit is connected to the first connection and the second connection to create a third voltage representing a difference between the first voltage and the second voltage. The gain circuit is connected to the summing circuit to adjust the third voltage by a proportional gain. The modulating circuit is connected to the gain circuit, the second connection, the third connection, the fourth connection and the fifth connection. The modulation circuit creates a control signal based on the second voltage, the adjusted third voltage, the first current and the second current. Typically, the first voltage is an output voltage from the converter, the second voltage is a reference voltage, the first current is an inductor current from the converter and the second current is a reference current. The control signal from the present invention can be used to control a boost converter, a buck-boost converter, or other converter type. Note also that the present invention can be applied to other non-linear systems.

The present invention also provides an apparatus that includes one or more electrical circuits that provide a control signal to a boost converter such that a duty cycle of the control signal is defined as $$d = -\frac{[CR_sR_c(R+R_c)+L(R+R_c)]x_1 + [(R+R_c)R_cC+L]\frac{(R+R_c)}{R}y - (R+R_c)R_cCu_0 - k(y-y_o)}{LRx_1 + [(R+R_c)R_cC]\frac{(R+R_c)}{R}y}.$$

Similarly, the present invention provides an apparatus that includes one or more electrical circuits that provide a control signal to a buck-boost converter such that a duty cycle of the control signal is defined as $$d = -\frac{[RR_cC+L]\frac{(R+R_c)}{R}y - \left[\begin{array}{c}(R+R_c)R_cR_sC-\\L(R+R_c)\end{array}\right]x_1 + k(y-y_0)}{(R+R_c)R_cCy + LRx_1 - (R+R_c)R_cCu_0}.$$

Moreover, the present invention can be sold as a kit for engineers to design and implement a PWM modulated converter. The kit may include a digital signal processor and a computer program embodied on a computer readable medium for programming the digital signal processor to control the PWM modulated converter. The computer program may also include one or more design tools. The digital signal processor includes a summing circuit, a gain circuit, a modulating circuit and various connections. The various connections include a first connection to receive a first voltage, a second connection to receive a second voltage, a third connection to receive a first current, a fourth connection to receive a second current and a fifth connection to output a control signal. The summing circuit is connected to the first connection and the second connection to create a third voltage representing a difference between the first voltage and the second voltage. The gain circuit is connected to the summing circuit to adjust the third voltage by a proportional gain. The modulating circuit is connected to the gain circuit, the second connection, the third connection, the fourth connection and the fifth connection. The modulation circuit creates a control signal based on the second voltage, the adjusted third voltage, the first current and the second current.

Furthermore, the present invention provides a method for controlling a non-linear system by receiving a first voltage, a second voltage, a first current and a second current and creating a third voltage representing a difference between the first voltage and the second voltage. The third voltage is then adjusted by a proportional gain. The control signal is created based on the second voltage, the adjusted third voltage, the first current and the second current. The non-linear system is then controlled using the control signal. Typically, the first voltage is an output voltage from the converter, the second voltage is a reference voltage, the first current is an inductor current from the converter and the second current is a reference current. The control signal provides leading-edge modulation with input-output linearization, such that control of the non-linear system cannot be unstable. Moreover, the control signal is created using a first order system, and is independent of a stabilizing gain, a desired output voltage or a desired output trajectory. As a result, the present invention also provides a converter controlled in accordance with the above-described method. Likewise, the present invention may include a computer program embodied within a digital signal processor for controlling a non-linear system wherein the steps of the above-described method are implemented as one or more code segments.

Other features and advantages of the present invention will be apparent to those of ordinary skill in the art upon reference to the following detailed description taken in conjunction with the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

Figure 1:
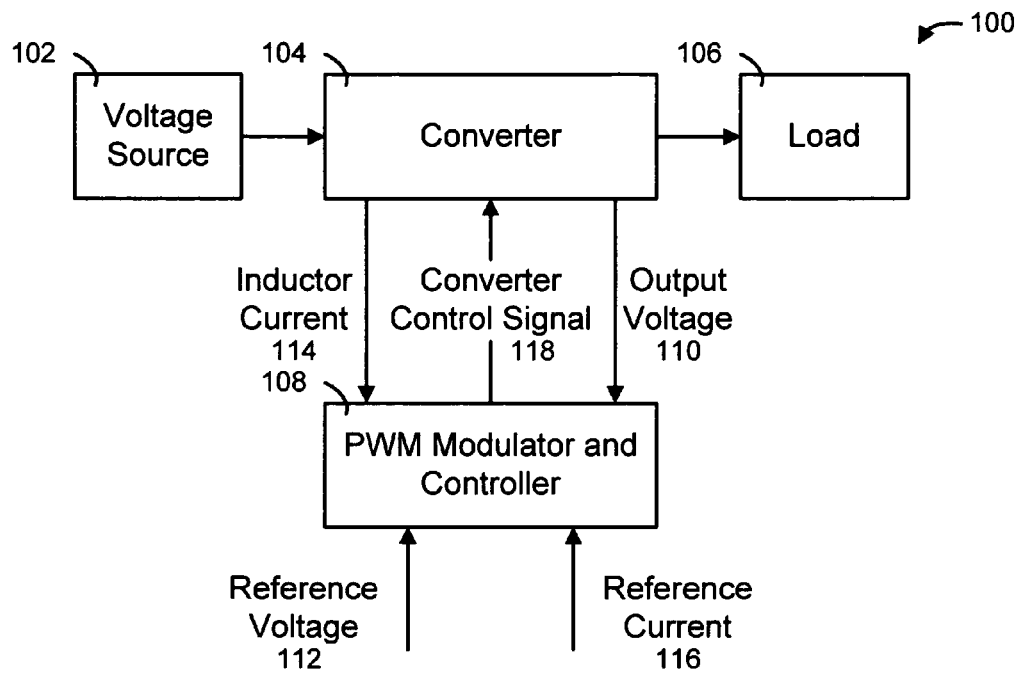
FIG. 1 is a block diagram of a system in accordance with the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

The present invention provides a system, method and apparatus for controlling converters using input-output linearization that does not constrain stability to one operating point, but rather to a set of operating points spanning the expected range of operation during startup and transient modes of operation. In particular, the present invention uses leading-edge modulation and input-output linearization to compute the duty ratio of a boost converter or a buck-boost converter. The present invention can also be applied to other converter types. Moreover, the parameters in this control system are programmable, and hence the algorithm can be easily implemented on a DSP or in silicon, such as an ASIC.

Notably, the present invention provides at least four advantages compared to the dominant techniques currently in use for power converters. The combination of leading-edge modulation and input-output linearization provides a linear system instead of a nonlinear system. In addition, the "zero dynamics" becomes stable because the zeros are in the left half plane instead of the right half plane. The present invention is also independent of stabilizing gain, as well as desired output voltage or desired output trajectory.

As previously described, trailing-edge modulation for boost and buck-boost converters operating in the continuous conduction mode gives rise to unstable zero dynamics where the linear part of the system about an operating point has a right half plane zero. In contrast, the present invention employs leading-edge modulation, along with some very simple design constraints, that change the zero dynamics so that the linear part of the system has only left half plane zeros.

Since the nonlinear system now possesses stable zero dynamics, input-output feedback linearization can be used. To apply this method, the actual output y is chosen as output function h(x), and y is repeatedly differentiated until the input u appears. The number of differentiations, r, is called the relative degree of the system. The present invention has a relative degree r=1. The linearizing transformation for d is solved and used for the control input. This transformation is local in nature, but it can be applied in a neighborhood of any state space operating point in DC-DC conversion.

It is desirable to choose any operating point for the nonlinear system. This operating point can be made locally asymptotically stable by the above process if a gain k is chosen to be positive. The gain k does not have to be adjusted for each operating point, i.e., no gain scheduling is required. However, the reference input will have to be walked up, which is typical of soft-start operation, to insure convergence to the operating point. Note that Proportional (P) and Proportional-Integral (PI) control loops can be added for robustness.

Now referring to FIG. 1, a block diagram of a system 100 in accordance with the present invention is shown. The system includes a power source (voltage) 102 connected to a converter 104 that provides power to a load 106. The converter 104 can be a boost converter, a buck-boost converter or other type of converter. The converter 104 is also connected to the PWM modulator/controller 108. The PWM modulator/controller 108 receives having a first voltage 110, a second voltage 112, a first current 114 and a second current 116. In most applications, the first voltage 110 is an output voltage from the converter 104, the second voltage 112 is a reference voltage, the first current 114 is an inductor current from the converter 104 and the second current 116 is a reference current. Note that sources of the second voltage 112 and second current 116 can be integrated within or external to the PWM modulator/controller 108. The PWM modulator/controller 108 uses the first voltage 110, the second voltage 112, the first current 114 and the second current 116 to generate a control signal 118 that is used to control the converter 104. The details of how the PWM modulator/controller 108 generates the control signal 118 will be described in more detail below. In addition, the PWM modulator/controller 108 can be implemented using a digital signal processor or conventional electrical circuitry.

Figure 2:
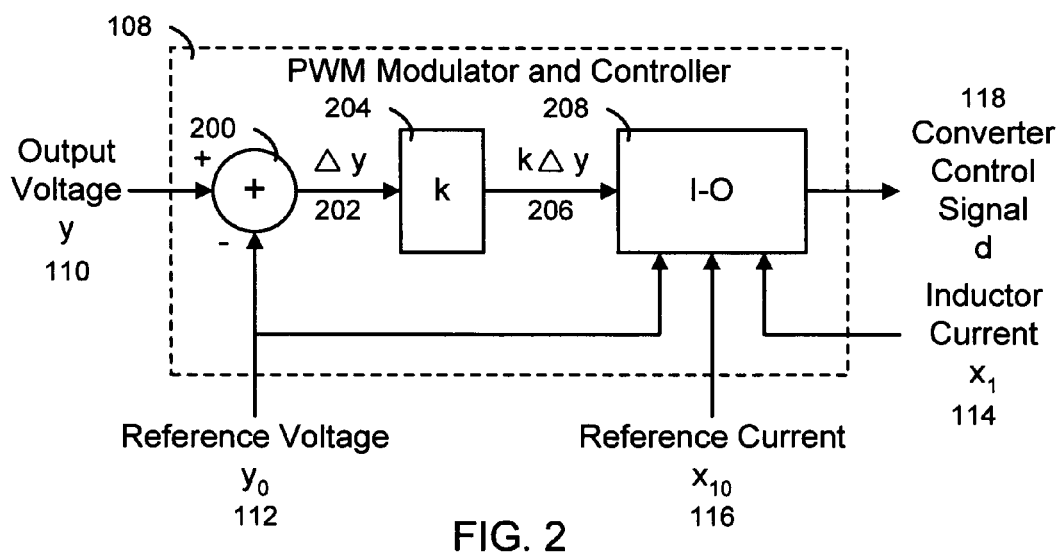
FIG. 2 is a block diagram of a modulator/controller in accordance with the present invention.

Referring now to FIG. 2, a block diagram of a modulator/controller 108 in accordance with the present invention is shown. The modulator/controller 108 includes a summing circuit 200, a gain circuit 204, a modulating circuit 208 and various connections. The connections include a first connection to receive a first voltage 110, a second connection to receive a second voltage 112, a third connection to receive a first current 114, a fourth connection to receive a second current 116, and a fifth connection to output a control signal 118. The summing circuit 200 is connected to the first connection and the second connection to create a third voltage (Δy) 202 representing a difference between the first voltage and the second voltage. The gain circuit 204 is connected to the summing circuit 200 to adjust the third voltage (Δy) 202 by a proportional gain (k). The modulating circuit 208 is connected to the gain circuit 204, the second connection, the third connection, the fourth connection and the fifth connection. The modulation circuit 208 creates a control signal 118 based on the second voltage, the adjusted third voltage (kΔy) 206, the first current and the second current. As implemented in the system of FIG. 1, the first voltage 110 is an output voltage from the converter 104, the second voltage 112 is a reference voltage, the first current 114 is an inductor current from the converter 104 and the second current 116 is a reference current. Typically, the control signal 118 will be used to control a boost converter, a buck-boost converter or other converter type. Note also that the present invention can be applied to other non-linear systems.

The present invention also provides an apparatus having one or more electrical circuits that provide a control signal 118 to a boost converter such that a duty cycle of the control signal is defined as $$d = -\frac{[CR_sR_c(R+R_c)+L(R+R_c)]x_1 + [(R+R_c)R_cC+L]\frac{(R+R_c)}{R}y - (R+R_c)R_cCu_0 - k(y-y_0)}{LRx_1 + [(R+R_c)R_cC]\frac{(R+R_c)}{R}y}.$$

Similarly, the present invention provides an apparatus having one or more electrical circuits that provide a control signal 118 to a buck-boost converter such that a duty cycle of the control signal is defined as $$d = -\frac{[RR_cC+L]\frac{(R+R_c)}{R}y - \begin{bmatrix}(R+R_c)R_cR_sC - \\ L(R+R_c)\end{bmatrix}x_1 + k(y-y_0)}{(R+R_c)R_cCy + LRx_1 - (R+R_c)R_cCu_0}.$$

The present invention can be sold as a kit for engineers to design and implement a PWM modulated converter. The kit may include a digital signal processor and a computer program embodied on a computer readable medium for programming the digital signal processor to control the PWM modulated converter. The computer program may also include one or more design tools. The digital signal processor includes a summing circuit 200, a gain circuit 204, a modulating circuit 208 and various connections. The connections include a first connection to receive a first voltage 110, a second connection to receive a second voltage 112, a third connection to receive a first current 114, a fourth connection to receive a second current 116, and a fifth connection to output a control signal 118. The summing circuit 200 is connected to the first connection and the second connection to create a third voltage ($\Delta y$) 202 representing a difference between the first voltage and the second voltage. The gain circuit 204 is connected to the summing circuit 200 to adjust the third voltage ($\Delta y$) 202 by a proportional gain (k). The modulating circuit 208 is connected to the gain circuit 204, the second connection, the third connection, the fourth connection and the fifth connection. The modulation circuit 208 creates a control signal 118 based on the second voltage, the adjusted third voltage ($k\Delta y$) 206, the first current and the second current. As implemented in the system of FIG. 1, the first voltage 110 is an output voltage from the converter 104, the second voltage 112 is a reference voltage, the first current 114 is an inductor current from the converter 104 and the second current 116 is a reference current.

Figure 3:
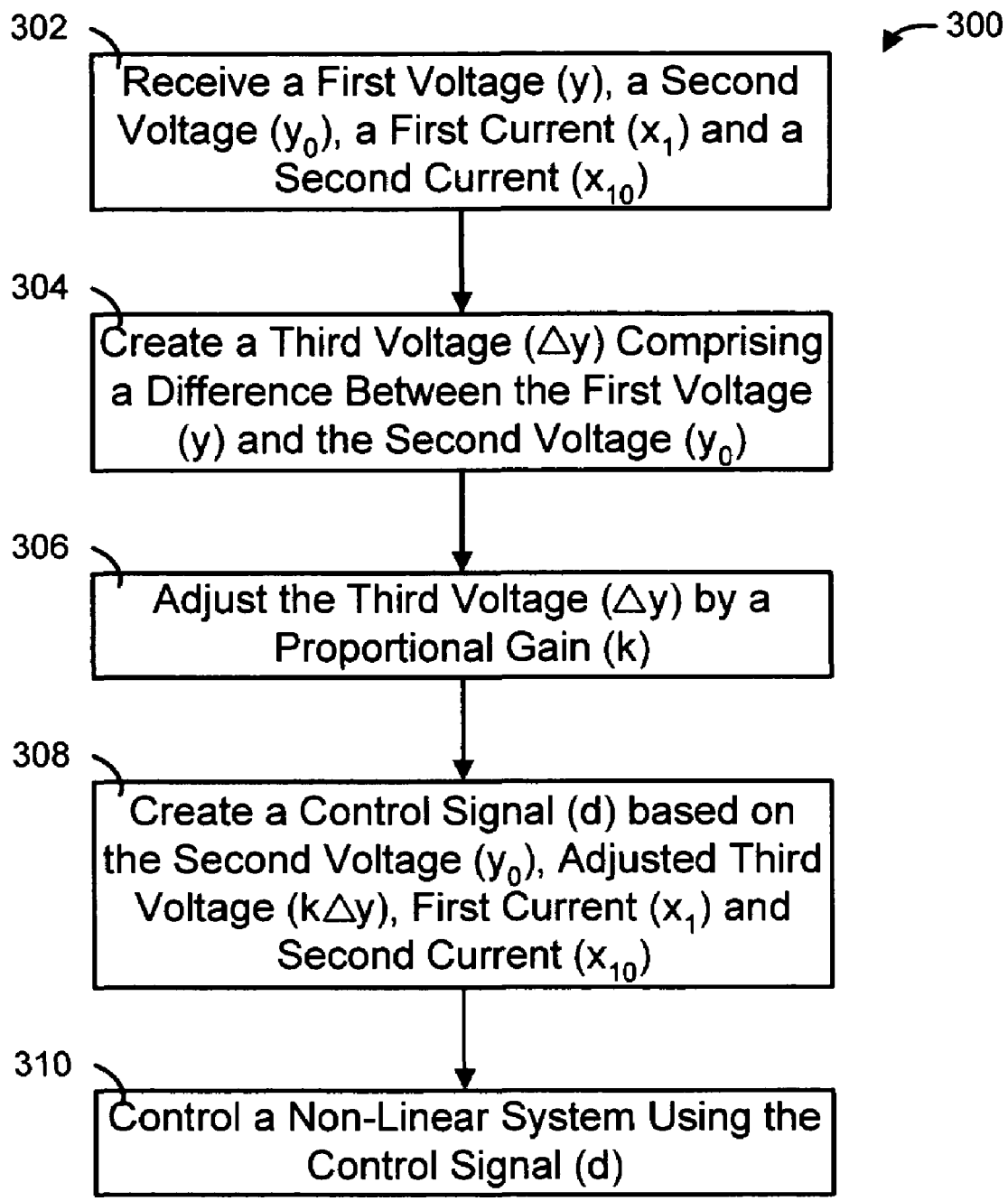
FIG. 3 is a flow chart of a control method in accordance with the present invention.

Now referring to FIG. 3, a flow chart 300 of a control method in accordance with the present invention is shown. The present invention provides a method for controlling a non-linear system by receiving a first voltage, a second voltage, a first current and a second current in block 302, creating a third voltage representing a difference between the first voltage and the second voltage in block 304 and adjusting the third voltage by a proportional gain in block 306. The control signal is created in block 308 based on the second voltage, the adjusted third voltage, the first current and the second current. The non-linear system is controlled using the control signal in block 310. In one embodiment of the present invention, the first voltage is an output voltage from the converter, the second voltage is a reference voltage, the first current is an inductor current from the converter and the second current is a reference current. Moreover, the nonlinear system can be a boost converter, a buck-boost converter or any other converter type.

In one embodiment, the non-linear system is a boost converter and a duty cycle for the control signal is defined as $$d = -\frac{[CR_sR_c(R+R_c)+L(R+R_c)]x_1 + [(R+R_c)R_cC+L]\frac{(R+R_c)}{R}y - (R+R_c)R_cCu_0 - k(y-y_0)}{LRx_1 + [(R+R_c)R_cC]\frac{(R+R_c)}{R}y}.$$

In yet another embodiment, the non-linear system is a buck-boost converter and a duty cycle for the control signal is defined as $$d = -\frac{[RR_cC+L]\frac{(R+R_c)}{R}y - \begin{bmatrix}(R+R_c)R_cR_sC - \\ L(R+R_c)\end{bmatrix}x_1 + k(y-y_0)}{(R+R_c)R_cCy + LRx_1 - (R+R_c)R_cCu_0}.$$

The control signal provides leading-edge modulation with input-output linearization, such that control of the non-linear system cannot be unstable. The control signal is created using a first order system, and is independent of a stabilizing gain, a desired output voltage or a desired output trajectory. As a result, the present invention also provides a converter controlled in accordance with the above-described method. Likewise, the present invention may include a computer program embodied within a digital signal processor for controlling a non-linear system wherein the steps of the above-described method are implemented as one or more code segments.

A more detailed description of the models used in the present invention will now be described. State space averaging allows the adding together of the contributions for each linear circuit during its respective time interval. This is done by using the duty ratio as a weighting factor on each interval. As shown below, this weighting process leads to a single set of equations for the states and the output. But first, the system will be described by its state space equations.

Assume that a linear system (A, b) is described by $$\dot{x}(t) = Ax(t) + bu(t) \qquad (1)$$

where $A \in \Re^{n \times n}$ is an 'n×n' matrix, and $b \in \Re^n$ is an 'n×1' column vector.

As previously mentioned, the duty ratio d is the ratio indicating the time in which a chosen switch is in the "on" position while the other switch is in the "off" position. Ts is the switching period. The "on" time is then denoted as dTs. The general state equations for any type of converter consisting of two linear switched networks are as follows:

For $0 \leq t \leq dTs$, $$\dot{x}(t) = A_\alpha x(t) + b_\alpha u(t) \quad (2a)$$

$dTs \leq t \leq Ts$, $$\dot{x}(t) = A_\beta x(t) + b_\beta u(t) \quad (2b)$$

The equations in (2a) can be combined with the equations in (2b) using the duty ratio, d, as a weighting factor. Thus, $$\dot{x}(t) = (dA_\alpha + d'A_\beta)x(t) + (db_\alpha + d'b_\beta)u(t) \quad (3)$$

which can be written in the form of equation (1) as $$\dot{x}(t) = Ax(t) + bu(t) \quad (4)$$

with $$A = dA_\alpha + d'A_\beta$$

and $$b = db_\alpha + d'b_\beta$$

where $d' = 1 - d$.

The buck cell is linear after state-space averaging and is therefore the easiest topology to control. On the other hand, the boost and buck-boost cells are nonlinear and have non-minimum phase characteristics. These nonlinear cells will be described.

Beginning with a vector field f(x) and a scalar function h(x), the Lie derivative of h with respect to f is denoted by $L_f h$. The derivative is a scalar function and can be understood as the directional derivative of h in the direction of the vector field f.

Definition: For a smooth scalar function $h: \mathfrak{R}^n \to \mathfrak{R}$ and a smooth vector field $f: \mathfrak{R}^n \to \mathfrak{R}^n$, the Lie derivative of h with respect to f is $$L_f h = \nabla h f. \quad (5)$$

or $$L_f h = \langle \nabla h, f \rangle \quad (6)$$

where $\nabla$ represents the gradient and bold type represents a vector field, $\nabla h f$ is matrix multiplication, and $\langle \nabla h, f \rangle$ is standard dot product on $\mathfrak{R}^n$.

Lie derivatives of any order can be defined as $$L_f^0 h = h \quad (7)$$

$$L_f^i h = \nabla(L_f^{i-1} h) f = L_f L_f^{i-1} h. \quad (8)$$

Also if g is another smooth vector field $g: \mathfrak{R}^n \to \mathfrak{R}^n$, then $$L_g L_f h = \nabla(L_f h) g. \quad (9)$$

Next, another operation is defined on vector fields, the Lie bracket.

Definition: For f and g as defined above, The Lie bracket of f and g is a vector field defined as $$[f, g] = \nabla g f - \nabla f g. \quad (10)$$

where $\nabla$ is the Jacobian of the associated vector field.

The Lie bracket [f, g] is also denoted by $ad_f g$. This notation makes it easier to define repeated brackets as $$ad_f^0 g = g \quad (11)$$

$$ad_f^i g = [f, ad_f^{i-1} g]. \quad (12)$$

Definition: A linearly independent set of vector fields $[f_1, f_2, \ldots, f_m]$ is said to be involutive if, and only if, there are scalar functions $\alpha_{ijk}: \mathfrak{R}^n \to \mathfrak{R}$ such that $$[f_i, f_j](x) = \sum_{k=1}^{m} \alpha_{ijk}(x) f_k(x) \; \forall \, i, j \quad (13)$$

Involutivity means that if one forms the Lie bracket of any pairs of vector fields from the set $[f_1, f_2, \ldots, f_m]$ then the resulting vector field can be expressed as a linear combination of the original set of vector fields.

Definition: A single input nonlinear system described by $$\dot{x} = f(x) + g(x)u \quad (14)$$

where f(x), g(x) are $C^\infty$ vector fields on $\mathfrak{R}^n$ and T is a diffeomorphism is input-state linearizable if $$\exists \Omega \subset \mathfrak{R}^n \, \mathfrak{R}^n_{z=T(x):\Omega \to \mathfrak{R}^n} \text{ and } \exists v = \alpha(x) + \beta(x)u, \beta(x) \neq 0 \quad (15)$$

so that $$\dot{z} = Az + bv \quad (16)$$

is a controllable linear time invariant system on $\Omega$ in $\mathfrak{R}^n$.

Furthermore, to be input-state feedback linearizable, the following two conditions must hold:
 (i) the vector fields $[g, [f,g], \ldots, [ad_f^{n-1} g]]$ are linearly independent in $\Omega$; and
 (ii) the distribution $D = \text{span}\{g, ad_f g, \ldots, ad_f^{n-2} g\}$ is involutive in $\Omega$.

The new state vector is now $$z = [T_1 \, L_f T_1 \ldots L_f^{n-1} T_1]^T = [T_1 \, T_2 \ldots T_n]^T \quad (17)$$

where the gradient of $T_1$ is orthogonal to the vector fields in D, and u is given by $$u = \alpha(x) + \beta(x)v \quad (18)$$

where $$\alpha = -\frac{L_f^n T_1}{L_g L_f^{n-1} T_1} \quad (19)$$

$$\beta = \frac{1}{L_g L_f^{n-1} T_1} \quad (20)$$

Some variables above will change depending on the application. These will be defined below.

Now, add an output y to the system. Unlike input-state linearization where a transformation is first found to generate a new state vector and a new control input, here the output y is repeatedly differentiated until the input u appears, thereby showing a relationship between y and u.

For the nonlinear system $$\dot{x} = f(x) + g(x)u \quad (21)$$
$$y = h(x)$$

and a point $x_0$, we differentiate y once to get $$\dot{y} = \nabla h \dot{x} = \nabla h f(x) + \nabla h g(x) u = L_f h(x) + L_g h(x) u.$$

This is differentiated repeatedly until the coefficient of u is non-zero. This procedure continues until for some integer $r \leq n$ $$L_g L_f^i h(x) = 0 \text{ for all } x \text{ near } x_0 \text{ and } 0 \leq i \leq r-2$$

and $$L_g L_f^{r-1} h(x_0) \neq 0$$

Then $$u = -\frac{(L_f^r h(x) + v)}{L_g L_f^{r-1} h(x)} \quad (22)$$

and, for v=0, results in a multiple integrator system with transfer function $$H(s) = \frac{1}{s^r} \quad (23)$$

State feedback can be added for pole placement with $$v = c_0 h(x) + c_1 L_f h(x) + c_2 L_f^2 h(x) + \ldots + c_{r-1} L_f^{r-1} h(x),$$

where $c_0, c_1, \ldots, c_{r-1}$ are constants to be chosen, and the integer r is the relative degree of the system (2-21). It is the number of differentiations required before u appears.

The first r new coordinates are found as above by differentiating the output h(x)

$$\dot{z}_1 = L_f h(x(t)) = z_2 \quad (24)$$
$$\dot{z}_2 = L_f^2 h(x(t)) = z_3$$
$$\ldots$$
$$\dot{z}_{r-1} = L_f^{r-1} h(x(t)) = z_r$$
$$\dot{z}_r = L_f^r h(x(t)) + L_g L_f^{r-1} h(x(t)) u(t)$$

Since $x(t) = \Phi^{-1}(z(t))$, let $$a(z) = L_g L_f^{r-1} h(\Phi^{-1}(z))$$
$$b(z) = L_f^r h(\Phi^{-1}(z))$$

which is recognized from (22) that a(z) is the denominator term and b(z) is the numerator. Now $$\dot{z}_r = b(z(t)) + a(z(t)) u(t)$$

where a(z(t)) is nonzero for all z in a neighborhood of $z^0$.

To find the remaining n–r coordinates, let $$\xi = \begin{bmatrix} z_1 \\ \vdots \\ z_r \end{bmatrix}$$

and $$\eta = \begin{bmatrix} z_{r+1} \\ \vdots \\ z_n \end{bmatrix}.$$

Here $z_{r+1}, \ldots, z_n$ are added to $z_1, \ldots z_r$ to provide a legitimate coordinate system. With this notation we can write the new coordinates in normal form as $$\dot{z}_1 = z_2 \quad (25)$$
$$\dot{z}_2 = z_3$$
$$\ldots$$
$$\dot{z}_{r-1} = z_r$$
$$\dot{z}_r = b(\xi, \eta) + a(\xi, \eta) u$$
$$\dot{\eta} = q(\xi, \eta) + p(\xi, \eta) u$$
$$y = z_1$$

The equation for $\eta$ represents the n–r equations for which no special form exists. The general equation, however, if the following condition holds $$L_g \Phi_i(x) = 0$$

is reduced $$\dot{\eta} = q(\xi, \eta)$$

and the input u does not appear.

In general, the new nonlinear system is described by $$\dot{\xi} = A\xi + Bv \quad (26a, b, c)$$
$$\dot{\eta} = q(\xi, \eta) + p(\xi, \eta) u$$
$$y = C\xi$$

with the matrices A, B, and C in normal form, and $$v = b(\xi, \eta) + a(\xi, \eta) u$$

If r=n, input-output linearization leads to input-state linearization. If r<n, then there are n–r equations describing the internal dynamics of the system. The zero dynamics, obtained by setting $\xi$=0 in equation (26b) and solving for $\eta$, are very important in determining the possible stabilization of the system (21). If these zero dynamics are non-minimum phase then the input-output linearization in (22) cannot be used. If, however, the zero dynamics are minimum phase it means that pole placement can be done on the linear part of (26a) using (22) and the system will be stable.

In the sequel, the bold letter used to indicate vector fields will only be used when the context is ambiguous as to what is meant. Otherwise, non-bold letters will be used. For a boost converter the driving voltage u(t), the current $x_1$ through the inductor, and the voltage $x_2$ across the capacitor are restricted to be positive, nonnegative, and positive, respectively. Only the continuous conduction mode (CCM) is considered. The duty ratio d is taken to be the control input and is constrained by $0 \leq d \leq 1$. The Ćuk-Middlebrook averaged nonlinear state equations are used to find a feedback transformation that maps these state equations to a controllable linear system. This transformation is one-to-one with the restrictions on u(t), $x_1$ and $x_2$ just mentioned and with additional restrictions involving $\dot{u}$. These additional restrictions are not needed if u(t) is a constant, as in DC-DC conversion. It is interesting to note that restrictions on $\dot{u}$ are unnecessary for the boost converter even if u(t) changes with time. The nonlinear system is said to be feedback linearizable or feedback linearized. Through the feedback transformation, the same second order linear system for every operating point can be seen.

The new switching model of the present invention will now be described in more detail. The physical component parasitics $R_s$, the DC series resistance of the filter inductor L, and $R_c$, the equivalent series resistance of the filter capacitor C, now need to be included since $R_c$ especially plays a central role in the analysis to follow.

The system in accordance with the present invention is of the form $$\dot{x} = f(x) + g(x)d$$

$$y = h(x) \qquad (27)$$

With this in mind, the state equations are derived to include parasitics $R_s$ and $R_c$.

There are four basic cells for fixed frequency PWM converters. They are the buck, boost, buck-boost, and boost-buck (Ćuk) topologies. Many derivations extend the basic cells in applications where isolation can be added between input and output via transformers, however, the operation can be understood through the basic cell. Each cell contains two switches. Proper operation of the switches results in a two-switch-state topology. In this regime, there is a controlling switch and a passive switch that are either on or off resulting in two "on" states. In contrast, a three state converter would consist of three switches, two controlling switches and one passive switch, resulting in three "on" states.

Figure 4A:
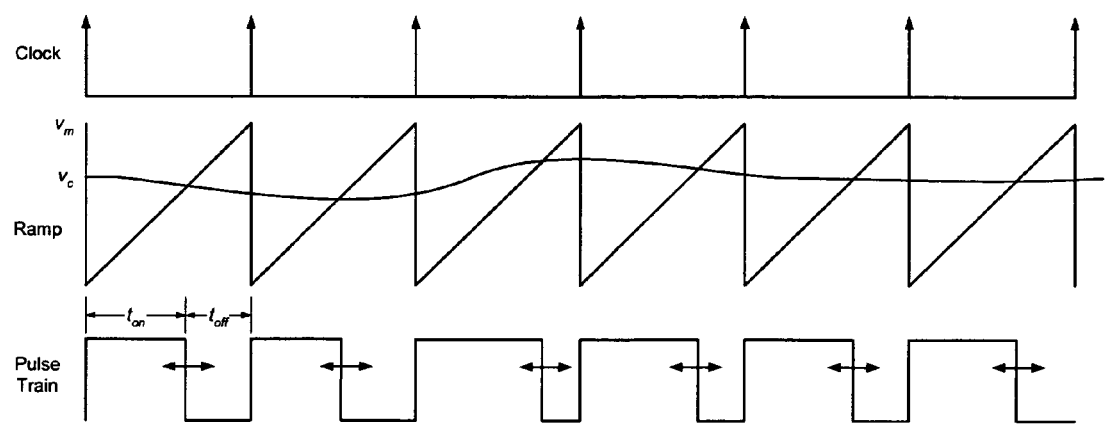
FIGS. 4A and 4B are graphs of trailing-edge modulation of a PWM signal and leading-edge modulation of a PWM signal.

The control philosophy used to control the switching sequence is pulse-width-modulation (PWM). A control voltage $v_c$ is compared with a ramp signal ("sawtooth") and the output pulse width is the result of $v_c > v_m$. This is shown in FIG. 4A. A new cycle is initiated on the negative slope of the ramp. The pulse ends when $v_c < v_m$ which causes modulation to occur on the trailing edge. This gives it the name "trailing-edge modulation."

Figure 4B:
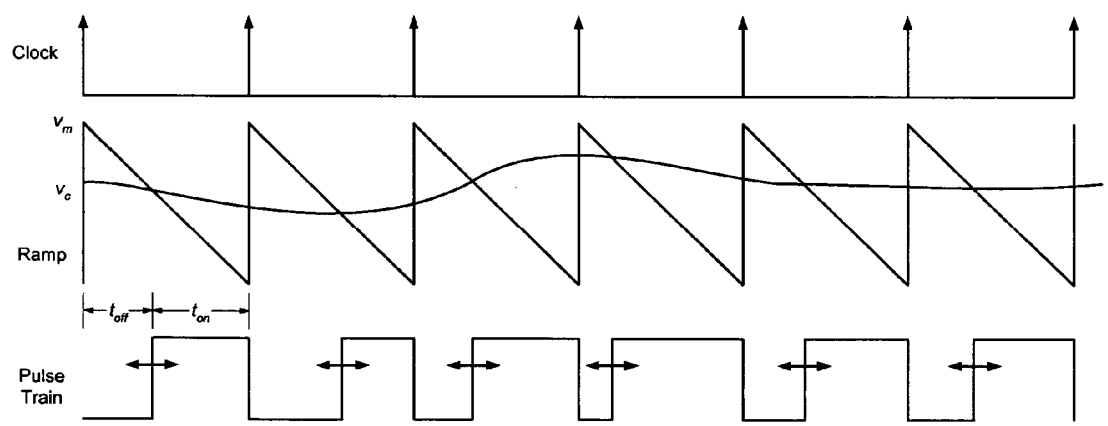

The difference between leading-edge modulation (LEM) and the conventionally used trailing-edge modulation (TEM) is that in TEM (FIG. 4A) the pulse-width is determined by the instantaneous control voltage $v_c$ prior to switch turn-off, whereas in LEM (FIG. 4B) the pulse-width is determined by $v_c$ prior to switch turn-on. The reason that sampling is "just prior" to switch commutation is that the intersection of $v_c$ and $v_m$ determines the new state of the switch. Notice that in FIG. 4B the sawtooth ramp has a negative slope.

Figure 5:
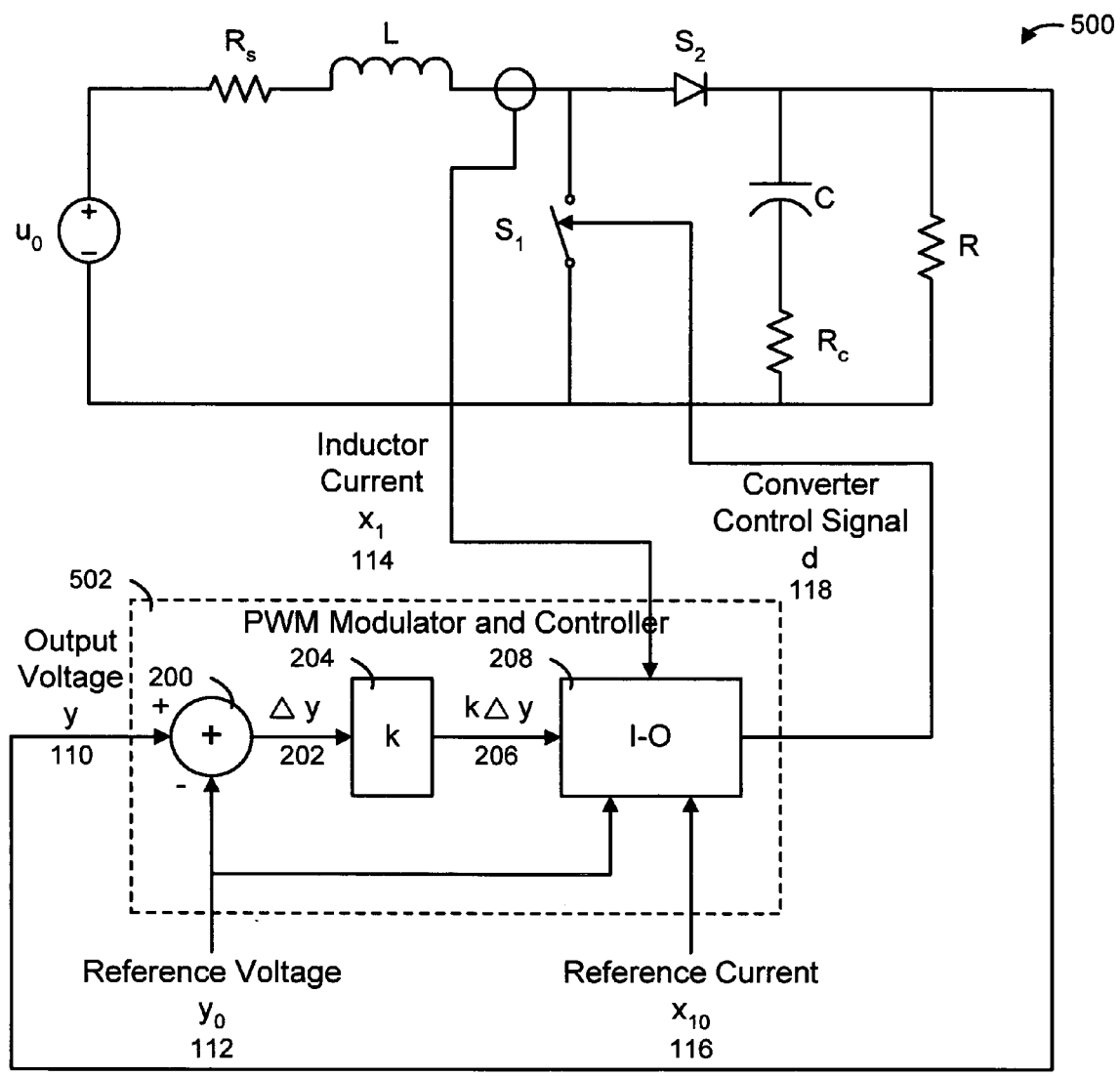
FIG. 5 is circuit diagram of a boost converter and a modulator/controller in accordance with the present invention.
Figure 6A:
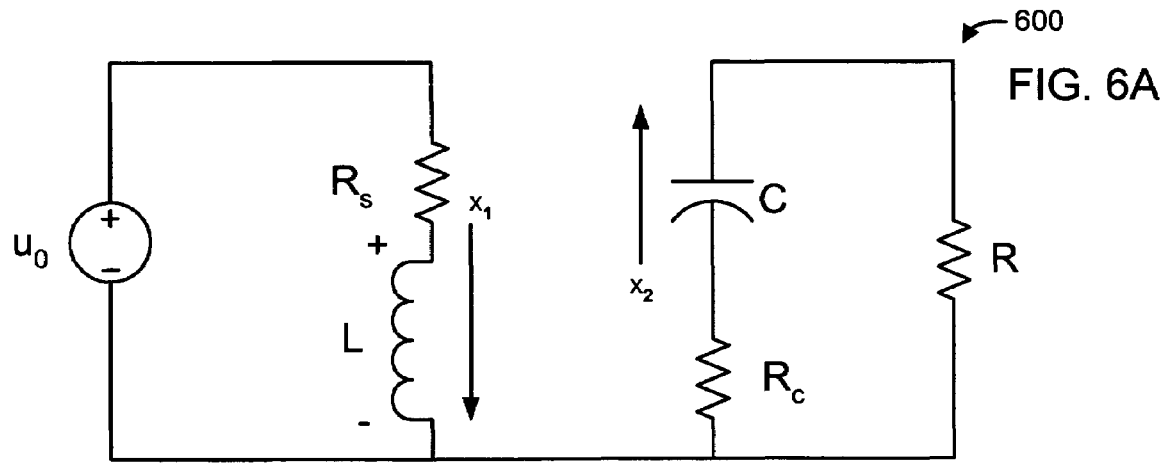
FIGS. 6A and 6B are linear circuit diagrams of a boost converter during time DTs and D'Ts, respectively in accordance with the present invention.
Figure 6B:
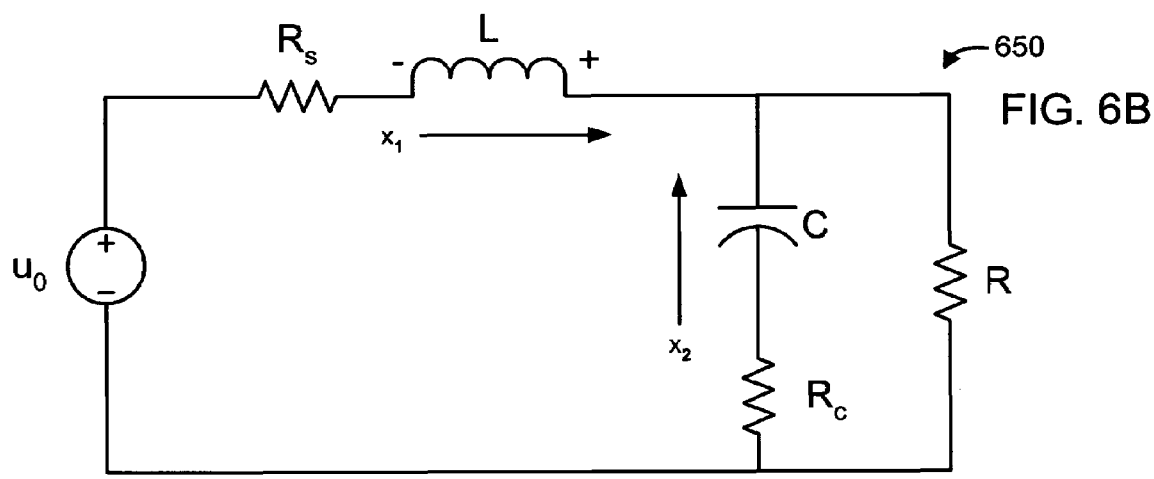
Figure 7:
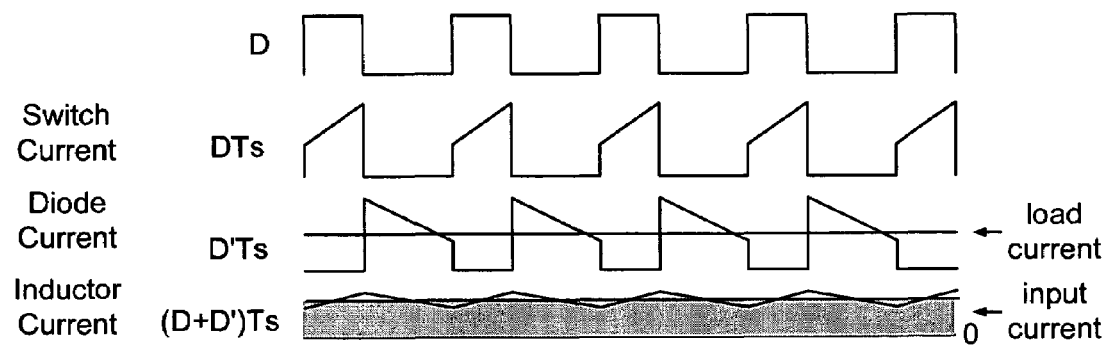
FIG. 7 is a graph of typical waveforms for the boost converter for the two switched intervals DTs and D'Ts in accordance with the present invention.

Now referring to FIG. 5, a circuit diagram 500 of a boost converter and a modulator/controller 502 in accordance with the present invention is shown. The specifics of the boost converter are well known. In this case, S2 is implemented with a diode and S1 is implemented with an N-channel MOSFET. FIGS. 6A and 6B are linear circuit diagrams 600 and 650 of the boost converter in FIG. 5 during time DTs and D'Ts, respectively. The converter 500 operates as follows: $u_0$ provides power to the circuit during S1 conduction time (FIG. 6A) storing energy in inductor L. During this time S2 is biased off. When S1 turns off, the energy in L causes the voltage across L to reverse polarity. Since one end is connected to the input source, $u_0$, it remains clamped while the other end forward biases diode S2 and clamps to the output. Current continues to flow through L during this time (FIG. 6B). When S1 turns back on, the cycle repeats. FIG. 7 illustrates the typical waveforms for the boost converter for the two switched intervals DTs and D'Ts.

The DC transfer function needs to be determined in order to know how the output, y, across the load R is related to the input $u_0$ at zero frequency. In steady state, the volt-second integral across L is equal to zero. Thus, $$\int_0^{T_s} v_L dt = 0 \qquad (28)$$

where Ts is the switching period.

Therefore, the volt-seconds during the on-time must equal the volt-seconds during the off-time. Using this volt-second balance constraint one can derive an equation for volt-seconds during the on-time of S1 (DTs) and another equation for volt-seconds during the off-time of S1 (D'Ts).

The parasitics are eliminated by setting $R_s = 0$ and $R_c = 0$.

During time DTs:

$$DT_s v_L = DT_s u_0 \qquad (29)$$

During time D'Ts:

$$D'T_s v_L = D'T_s x_2 - D'T_s u_0 \qquad (30)$$

Since by equation (28)

$$DT_s v_L = D'T_s v_L$$

the RHS of equation (29) is set equal to the RHS of equation (30) resulting in $$\frac{x_2}{u_0} = \frac{1}{D'} \qquad (31)$$

Equation (31) is the ideal duty ratio equation for the boost cell. If $R_s$ and $R_c$ are both non-zero then $$\frac{y}{u_0 - x_1 R_s} = \frac{1}{D'} \qquad (32)$$

The output y is $$y = D' \frac{RR_c}{R + R_c} x_1 + \frac{R}{R + R_c} x_2 \qquad (33)$$

During dTs:

$$\dot{x}_1 = \frac{1}{L}u - \frac{R_s}{L}x_1$$

$$\dot{x}_2 = -\frac{1}{C(R+R_c)}x_2$$

During $(1-d)T_s$:

$$\dot{x}_1 = \frac{1}{L}\left[-\left(R_s + \frac{RR_c}{R+R_c}\right)x_1 - \frac{R}{R+R_c}x_2 + u_0\right]$$

$$\dot{x}_2 = \frac{R}{C(R+R_c)}x_1 - \frac{1}{C(R+R_c)}x_2$$

Combining, the averaged equations are:

$$\dot{x}_1 = \frac{1}{L}u_0 - \frac{R_s}{L}x_1 - \frac{RR_c}{L(R+R_c)}x_1(1-d) - \frac{R}{L(R+R_c)}x_2(1-d) \quad \text{(34a, b, c)}$$

$$\dot{x}_2 = \frac{R}{C(R+R_c)}x_1(1-d) - \frac{1}{C(R+R_c)}x_2$$

$$y = \frac{R}{(R+R_c)}x_2 + \frac{RR_c}{(R+R_c)}x_1(1-d)$$

where $R_s$ is the dc resistance of L and $R_c$ is the equivalent series resistance of C.

In standard form:

$$\dot{x}_1 = \frac{u_0}{L} - \frac{R}{L(R+R_c)}x_2 - \left(\frac{R_s}{L} + \frac{RR_c}{L(R+R_c)}\right)x_1 + \quad \text{(35a, b, c)}$$

$$\left(\frac{RR_c}{L(R+R_c)}x_1 + \frac{R}{L(R+R_c)}x_2\right)d$$

$$\dot{x}_2 = -\frac{1}{C(R+R_c)}x_2 + \frac{R}{C(R+R_c)}x_1 - \frac{R}{C(R+R_c)}x_1 d$$

$$y = \frac{RR_c}{(R+R_c)}x_1 + \frac{R}{(R+R_c)}x_2$$

Here it is assumed that leading-edge modulation is used so that sampling of the output y only takes place during the interval $(1-d)T_s$. Therefore, the weighting factor $(1-d)$ in equation (34c) for y has been removed because when the sample is taken the data represents both terms as shown in equation (35c). In the present analysis the effects of sampling (complex positive zero pair at one-half the sampling frequency) have been ignored.

The input-output linearization for the boost converter will now be discussed. The output, y, only needs to be differentiated once before the control d appears.

$$y = \frac{R}{R+R_c}(x_2 + R_c x_1) \quad \text{(36)}$$

$$\dot{y} = \frac{R}{R+Rc}(\dot{x}_2 + R_c \dot{x}_1)$$

-continued $$\dot{y} = \left(\frac{R}{R+Rc}\right)\left(\frac{1}{C(R+R_c)}(-x_2 + Rx_1 - Rx_1 d) + \right. \quad \text{(37a, b)}$$

$$\left.\frac{R_c}{L}\left(u_0 - x_2 - \left(R_s + \frac{RR_c}{R+R_c}\right)x_1 + \left(R_c x_1 + \frac{R}{R+R_c}x_2\right)d\right)\right)$$

Substituting for $x_2$ from (36), setting $\dot{y}$ to zero and solving for d we get, $$d = -\frac{[CR_s R_c(R+R_c) + L(R+R_c)]x_1 + [(R+R_c)R_c C + L]\frac{(R+R_c)}{R}y - (R+R_c)R_c Cu_0 - k(y-y_0)}{LRx_1 + [(R+R_c)R_c C]\frac{(R+R_c)}{R}y} \quad \text{(38)}$$

where the error term $k(y-y_0)$ has been added. Here $y_0$ is the desired output corresponding to $x_{10}$ and $x_{20}$ through equation (36). The notation has changed and $k=c_0$ in equation (22), and the control input is now d instead of u. Here $(x_{10}, x_{20})$ is an equilibrium point of the boost converter.

Implementation of this control differs from others that correct the state before the transformation T, since the control is now part of the transformation as shown in equation (38) where it is seen that $k(y-y_0)$ is in the numerator, and k is the proportional gain. The control implementation is shown in FIG. 2.

Local linearization of the boost converter will now be discussed to obtain a transfer function. A Taylor Series linearization is used on the nonlinear system (35abc) to linearize about an operating point, $x_{10}$, $x_{20}$, D and obtain the transfer function. As before $$\hat{x}_1 = x_1 - x_{10}, \hat{x}_2 = x_2 - x_{20}, \hat{y} = y - y_0, \hat{d} = d - D.$$

which gives $$\dot{\hat{x}}_1 = \frac{1}{L}\left[-\frac{(1-D)R}{R+R_c}\hat{x}_2 - \frac{(1-D)RR_c}{R+R_c}\hat{x}_1 - R_s \hat{x}_1 + \left(\frac{RR_c}{R+R_c}x_{10} + \frac{R}{R+R_c}x_{20}\right)\hat{d}\right]$$

$$\dot{\hat{x}}_2 = \frac{1}{C(R+R_c)}\left[-\hat{x}_2 + (1-D)R\hat{x}_1 - Rx_{10}\hat{d}\right]$$

In matrix form $$\begin{bmatrix}\dot{\hat{x}}_1 \\ \dot{\hat{x}}_2\end{bmatrix} = \begin{bmatrix}-\left(\frac{RR_c(1-D)}{L(R+R_c)} + \frac{R_s}{L}\right) & -\frac{(1-D)R}{L(R+R_c)} \\ \frac{R(1-D)}{C(R+R_c)} & -\frac{1}{C(R+R_c)}\end{bmatrix}\begin{bmatrix}\hat{x}_1 \\ \hat{x}_2\end{bmatrix} + \begin{bmatrix}\frac{RR_c x_{10} + Rx_{20}}{L(R+R_c)} \\ \frac{Rx_{10}}{C(R+R_c)}\end{bmatrix}\hat{d}.$$

Making the following substitutions, which can be derived by letting $\dot{x}_1=0, \dot{x}_2=0, x_1=x_{10}, x_2=x_{20}, R_c=0,$ and $R_s=0$ in (35ab):

$$x_{10} = \frac{u_0}{(1-D)^2 R}$$

and

-continued $$x_{20} = \frac{u_0}{(1-D)}$$

results in $$\begin{bmatrix} \dot{\hat{x}}_1 \\ \dot{\hat{x}}_2 \end{bmatrix} = \begin{bmatrix} -\left(\frac{RR_c(1-D)}{L(R+R_c)} + \frac{R_s}{L}\right) & -\frac{(1-D)R}{L(R+R_c)} \\ \frac{R(1-D)}{C(R+R_c)} & -\frac{1}{C(R+R_c)} \end{bmatrix} \quad (39)$$

$$\begin{bmatrix} \hat{x}_1 \\ \hat{x}_2 \end{bmatrix} + \begin{bmatrix} \frac{u_0}{(1-D)}\left(\frac{R_c}{L(R+R_c)(1-D)} + \frac{1}{L}\right) \\ -\frac{u_0}{C(R+R_c)(1-D)^2} \end{bmatrix} \hat{d}$$

$$\hat{y} = \begin{bmatrix} \frac{RR_c}{R+R_c} & \frac{R}{R+R_c} \end{bmatrix} \hat{x} \quad (40)$$

Now a linear system is provided $$\dot{\hat{x}} = A\hat{x} + B\hat{d}$$

$$\hat{y} = C\hat{x} \quad (41)$$

where A is an n×n matrix, B is an n-column vector, and C is an n-row vector. To find the transfer function, solve the matrix equation $$G_p(s) = C[sI-A]^{-1}B.$$

and obtain $$G_p(s) = \frac{1}{\Delta(s)} \begin{bmatrix} \frac{RR_c}{R+R_c} & \frac{R}{R+R_c} \end{bmatrix} \begin{bmatrix} s + \frac{1}{C(R+R_c)} & -\frac{(1-D)R}{L(R+R_c)} \\ \frac{R(1-D)}{C(R+R_c)} & s + \left(\frac{RR_c(1-D)}{L(R+R_c)} + \frac{R_s}{L}\right) \end{bmatrix}$$

$$\begin{bmatrix} \frac{u_0}{(1-D)}\left(\frac{R_c}{L(R+R_c)(1-D)} + \frac{1}{L}\right) \\ -\frac{u_0}{C(R+R_c)(1-D)^2} \end{bmatrix}$$

If we set $R_s=0$ and let powers greater than one of $R_c$ equal zero, further evaluation results in $$G_p(s) = \frac{1}{\Delta(s)}\left[\frac{1}{LC(R+R_c)^2} \frac{u_0}{(1-D)^2}\left[(R+R_c)(L-RR_cC(1-D))s + \right. \right. \quad (42)$$

$$\left. \left. (R^2(1-D)^2 + 2RR_c(1-D) + (1-D)^2R_c)\right]\right]$$

where $\Delta(s)$ is the determinant of $[sI-A]^{-1}$ which is $$\Delta(s) = \quad (43)$$

$$s^2 + \frac{L(R+R_c) + RR_cC(R+R_c)(1-D)}{(R+R_c)^2LC}s + \frac{RR_c(1-D) + R^2(1-D)^2}{(R+R_c)^2LC}$$

Taking the term in (42) associated with s, the zero of the linear system needs to be in the left-half plane, so this term needs to remain positive. Solving for $R_cC$ we have $$R_cC > \frac{L}{R(1-D)} \quad (44)$$

At this point, the transfer function has been shown to be the linear approximation of the nonlinear system having a left-half plane zero under constraint (44). The zeros of the transfer function of the linear approximation of the nonlinear system at x=0 coincide with the eigenvalues of the linear approximation of the zero dynamics of the nonlinear system at η=0. Therefore, the original nonlinear system (35) has asymptotically stable zero dynamics. Furthermore, the following proposition is associated with the system (25).

Proposition. Suppose the equilibrium η=0 of the zero dynamics of the system is locally asymptotically stable and all the roots of the polynomial p(s) have negative real part. Then the feedback law $$u = \frac{1}{a(\xi,\eta)}(-b(\xi,\eta) - c_0 z_1 - c_1 z_2 - \cdots - c_{r-1} z_r) \quad (45)$$

locally asymptotically stabilizes the equilibrium $(\xi, \eta)=(0, 0)$.

The polynomial $$p(s) = s^r + c_{r-1}s^{r-1} + \ldots + c_1 s + c_0 \quad (46)$$

is the characteristic polynomial of the matrix A associated with the closed loop system (see equations (25) and (45) and recall that $z=\xi$)

$$\dot{\xi} = A\xi + Bv$$

$$\dot{\eta} = q(\xi,\eta) \quad (47)$$

where $\dot{\xi}=A\xi+Bv$ are the linear part of the system and $\dot{\eta}=q(0,\eta)$ are the zero dynamics. The matrix A is given by $$A = \begin{bmatrix} 0 & 1 & 0 & \cdots & 0 \\ 0 & 0 & 1 & \cdots & 0 \\ \vdots & \vdots & \vdots & \vdots & \vdots \\ 0 & 0 & 0 & \cdots & 1 \\ -c_0 & -c_1 & -c_2 & \cdots & -c_{r-1} \end{bmatrix}.$$

and the vector B is given by $$B = [0, \ldots, 0, 1]^T.$$

The feedback law in equation (45) can be expressed in the original coordinates as $$u = \frac{1}{L_g L_f^{r-1} h(x)}(-L_f^r h(x) - c_0 h(x) - c_1 L_f h(x) - \cdots - c_{r-1} L_f^{r-1} h(x)) \quad (48)$$

As shown in equation (37), the input d appears after only one differentiation so the relative degree is one. This means that the present invention is a single order linear system containing only one root, thus the present invention can be expressed in the new coordinates as $$\dot{\xi} = -k\xi + v$$

$$\dot{\eta} = q(\xi, \eta)$$

$$y = \xi$$

The polynomial p(s) is simply p(s)=s+k, with k>0, so that the denominator is now a real pole in the left half plane.

In accordance with the Proposition, the root of the polynomial p(s) has a negative real part, and as shown above, the present invention has asymptotically stable zero dynamics. Therefore, it can be concluded that, given a control law of the form (48), the original nonlinear system (35) is locally asymptotically stable.

The following theorem has been proven.

Theorem 1: For a boost converter with asymptotically stable zero dynamics (using leading-edge modulation), with constraint $$R_c C > \frac{L}{R(1-D)} \quad (49)$$

and control law $$d = \frac{1}{L_g L_f^{r-1} y} (-L_f^r y - k(y - y_0)); \quad (50)$$

the nonlinear system $$\dot{\xi} = -k\xi + v$$

$$\dot{\eta} = q(\xi, \eta),$$

$$y = \xi \quad (51)$$

with v=0, is asymptotically stable at each equilibrium point (the characteristic polynomial p(s) has a root with negative real part) which means that the original nonlinear system $$\dot{x} = f(x) + g(x)d$$

$$y = h(x) \quad (52)$$

is locally asymptotically stable at each equilibrium point ($x_{10}$, $x_{20}$) in the set $$S = \{(x_1, x_2), x \in \mathfrak{R}^n : x_1 \geq 0, x_2 > 0\}$$

with 0≦d<1.

Recall that ($x_{10}$, $x_{20}$) corresponds to $y_0$ through equation (36). Theorem 1 indicates local asymptotic stability. In practice, the reference input $y_0$ is ramped up in a so-called "soft-start" mode of operation. This theorem also guarantees local asymptotic stability at each operating point passed through by the system on its way up to the desired operating point.

Figure 8:
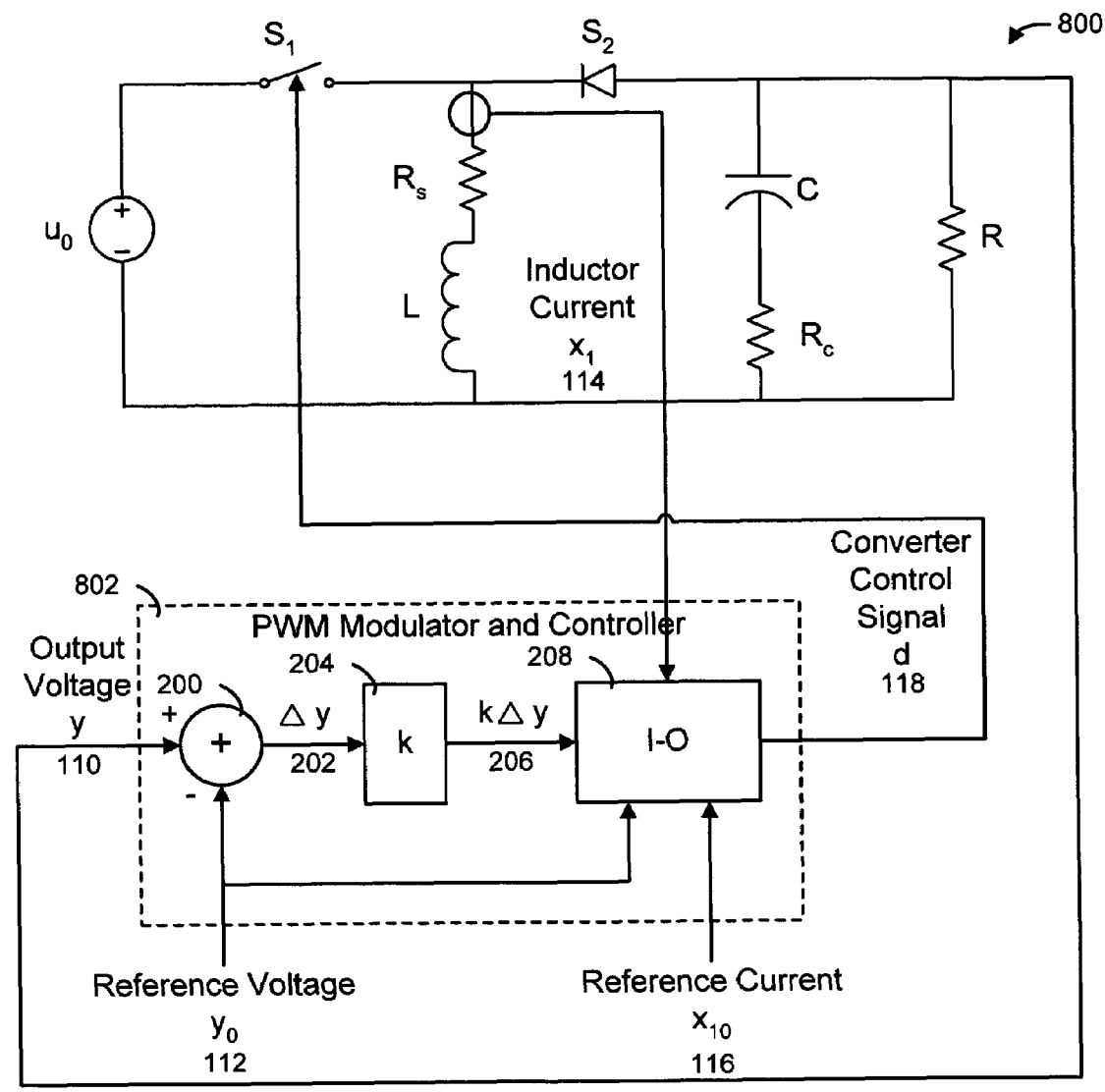
FIG. 8 is circuit diagram of a buck-boost converter and a modulator/controller in accordance with the present invention.
Figure 9A:
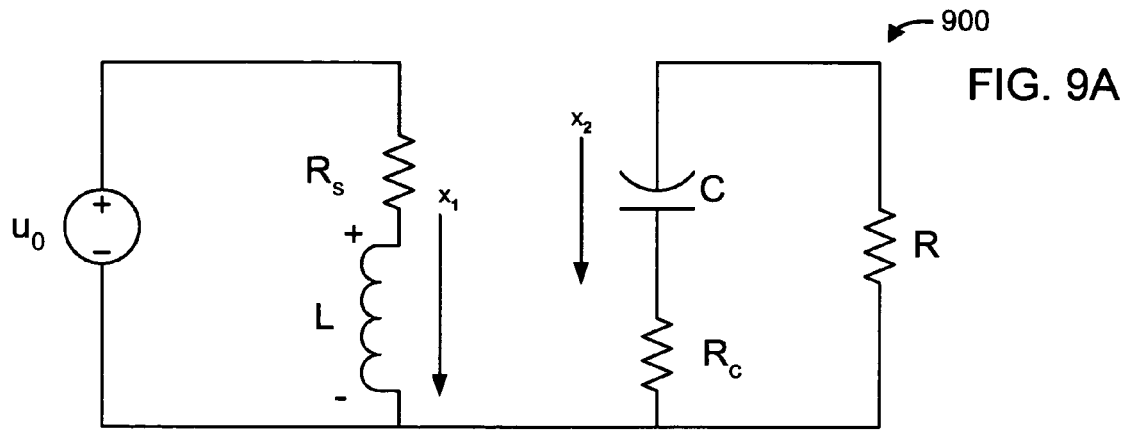
FIGS. 9A and 9B are linear circuit diagrams of a buck-boost converter during time DTs and D'Ts, respectively in accordance with the present invention.
Figure 9B:
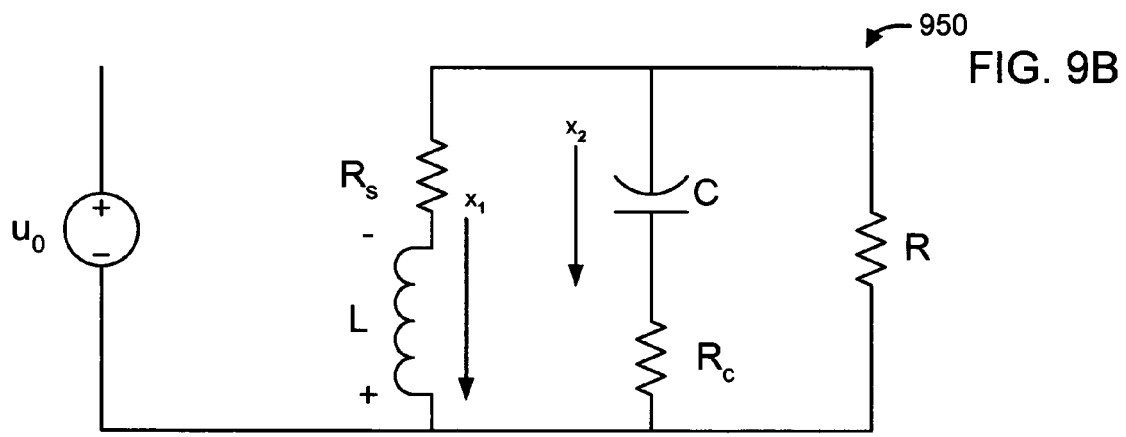
Figure 10:
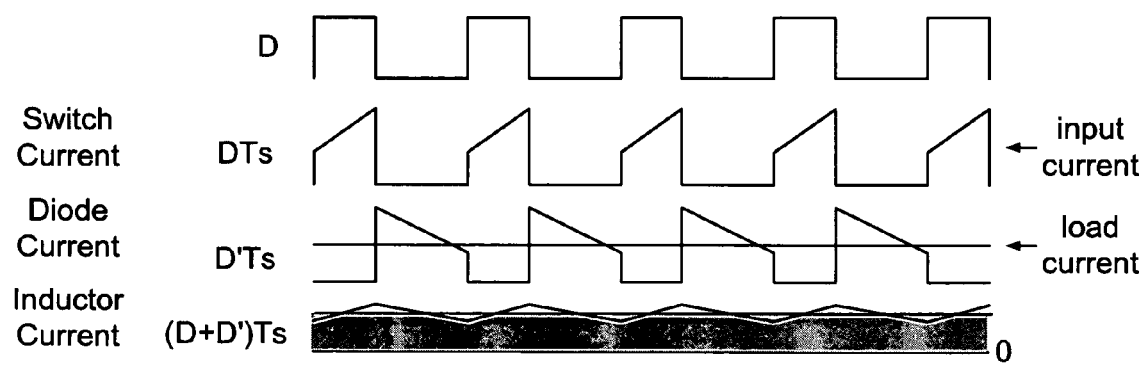
FIG. 10 is a graph of typical waveforms for the buck-boost converter for the two switched intervals DTs and D'Ts in accordance with the present invention.

Now referring to FIG. 8, a circuit diagram 800 of a buck-boost converter and a modulator/controller 802 in accordance with the present invention are shown. The details of buck-boost converters are well known. In this case, S2 is implemented with a diode and S1 is implemented with an N-channel MOSFET. FIGS. 9A and 9B are linear circuit diagrams 900 and 950 of a buck-boost converter during time DTs and D'Ts. The operation of the converter is as follows: $u_0$ provides power to the circuit during S1 conduction time (FIG. 9A) storing energy in inductor L. During this time S2 is biased off. When S1 turns off, the energy in L causes the voltage across L to reverse polarity. Since one end is connected to circuit return, it remains clamped while the other end forward biases diode S2 and clamps to the output. Current continues to flow through L during this time (FIG. 9B). When S1 turns back on, the cycle repeats. It should be noted that the output voltage is inverted, i.e., negative. FIG. 10 is a graph of typical waveforms for the buck-boost converter for the two switched intervals DTs and D'Ts.

It is again desirable to find the DC transfer function to know how the output, y, across the load R is related to the input $u_0$ at zero frequency. In steady state, the volt-second integral across L is again equal to zero. Thus, $$\int_0^{T_s} v_L dt = 0 \quad (53)$$

where Ts is the switching period.

Therefore, the volt-seconds during the on-time must equal the volt-seconds during the off-time. Using this volt-second balance constraint one can derive an equation for volt-seconds during the on-time of S1 (DTs) and another equation for volt-seconds during the off-time of S1 (D'Ts).

The parasitics are eliminated by setting $R_s$=0 and $R_c$=0.

During time DTs:

$$DT_s v_L = DT_s u_0 \quad (54)$$

During time D'Ts:

$$D'T_s v_L = -D'T x_s x_2 \quad (55)$$

Since by equation (1)

$$DT_s v_L = D'T_s v_L$$

The RHS of equation (54) is set equal to the RHS of equation (55) to provide $$\frac{x_2}{u_0} = -\frac{D}{D'} \quad (56)$$

Equation (56) is the ideal duty ratio equation for the buck-boost cell. If $R_s$ and $R_c$ are both non-zero then $$\frac{y}{u_0} - \frac{x_1 R_s}{D' u_0} = -\frac{D}{D'} \quad (57)$$

The output y is $$y = -D' \frac{RR_c}{R + R_c} x_1 + \frac{R}{R + R_c} x_2 \quad (58)$$

Once again it is seen in equation (57) that parasitic $R_s$ should be minimized. For example if $R_s$=0 and $R_c$=0, then equation (57) reduces to the ideal equation (56).

During dTs:

$$\dot{x}_1 = \frac{1}{L}u - \frac{R_s}{L}x_1$$

$$\dot{x}_2 = -\frac{1}{C(R+R_c)}x_2$$

During (1−d)Ts:

$$\dot{x}_1 = \frac{1}{L}\left(-\left(R_s + \frac{RR_c}{R+R_c}\right)x_1 + \frac{R}{R+R_c}x_2\right)$$

$$\dot{x}_2 = -\frac{R}{C(R+R_c)}x_1 - \frac{1}{C(R+R_c)}x_2$$

Combining, the averaged equations are:

$$\dot{x}_1 = \frac{1}{L}u_0 d - \frac{R_s}{L}x_1 - \frac{RR_c}{L(R+R_c)}x_1(1-d) + \frac{Rx_2}{L(R+R_c)}(1-d) \quad (59a)$$

$$\dot{x}_2 = -\frac{R}{C(R+R_c)}x_1(1-d) - \frac{1}{C(R+R_c)}x_2 \quad (60b, c)$$

$$y = \frac{R}{(R+R_c)}x_2 - \frac{RR_c}{(R+R_c)}x_1(1-d)$$

In standard form:

$$\dot{x}_1 = \frac{Rx_2}{L(R+R_c)} - \left(\frac{R_s}{L} + \frac{RR_c}{L(R+R_c)}\right)x_1 + \quad (61a, b, c)$$
$$\left(\frac{RR_c}{L(R+R_c)}x_1 - \frac{Rx_2}{L(R+R_c)} + \frac{u_0}{L}\right)d$$

$$\dot{x}_2 = -\frac{1}{C(R+R_c)}x_2 - \frac{R}{C(R+R_c)}x_1 + \frac{R}{C(R+R_c)}x_1 d$$

$$y = -\frac{RR_c}{(R+R_c)}x_1 + \frac{R}{(R+R_c)}x_2$$

Here it is assumed that leading-edge modulation is used so that sampling of the output y only takes place during the interval $(1-d)T_s$. Therefore, the weighting factor $(1-d)$ in equation (60c) for y has been removed in equation (61c) because when the sample is taken the data represents both terms. In the present analysis the effects of sampling (complex positive zero pair at one-half the sampling frequency) have been ignored.

The output, y, only needs to be differentiated once before the control d appears. Thus, $$y = \frac{R}{R+R_c}(x_2 - R_c x_1) \quad (62)$$

$$\dot{y} = \frac{R}{R+R_c}(\dot{x}_2 - R_c \dot{x}_1) \quad (63a)$$

-continued $$\dot{y} = \left(\frac{R}{R+R_c}\right)\left[\frac{1}{C(R+R_c)}(-x_2 - Rx_1 + Rx_1 d) - \quad (63b)\right.$$
$$R_c\left(\frac{1}{L}\left(\frac{R}{R+R_c}x_2 - \left(R_s + \frac{RR_c}{R+R_c}\right)x_1 + \right.\right.$$
$$\left.\left.\left.\left(\frac{RR_c}{R+R_c}x_1 - \frac{R}{R+R_c}x_2 + u_0\right)d\right)\right)\right]$$

Substituting for $x_2$ from (62), setting $\dot{y}$ to zero and solving for d provides, $$d = -\frac{[RR_c C + L]\frac{(R+R_c)}{R}y - }{(R+R_c)R_c Cy + LRx_1 - (R+R_c)R_c Cu_0} \quad (64)$$
$$\phantom{d = -}\frac{[(R+R_c)R_c R_s C - L(R+R_c)]x_1 + k(y - y_0)}{(R+R_c)R_c Cy + LRx_1 - (R+R_c)R_c Cu_0}$$

where the error term $k(y-y_0)$ has been added. Here $y_0$ is the desired output corresponding to $x_{10}$ and $x_{20}$ through equation (62). The notation has changed and $k=c_0$ in equation (22), and the control input is now d instead of u. Here $(x_{10}, x_{20})$ is an equilibrium point of our buck-boost converter. Implementation of the control is the same as shown in FIG. 2. The same definitions are used, so the local linearization will be discussed.

To obtain the transfer function, a Taylor Series linearization is again used on the nonlinear system (61) to linearize about an operating point, $x_{10}, x_{20}, D$ to provide $$\hat{x}_1 = x_1 - x_{10}, \hat{x}_2 = x_2 - x_{20}, \hat{y} = y - y_0, \hat{d} = d_1 - D.$$

This gives $$\dot{\hat{x}}_1 = \frac{1}{L}\left[-\left(R_s + \frac{RR_c}{R+R_c}(1-D)\right)\hat{x}_1 + \right.$$
$$\left.\frac{R}{R+R_c}(1-D)\hat{x}_2 + \left(u_0 + \frac{RR_c}{R+R_c}x_{10} - \frac{R}{R+R_c}x_{20}\right)\hat{d}\right]$$

$$\dot{\hat{x}}_2 = \frac{1}{C(R+R_c)}\left[-\hat{x}_2 - (1-D)R\hat{x}_1 + Rx_{10}\hat{d}\right]$$

In matrix form $$\begin{bmatrix}\dot{\hat{x}}_1 \\ \dot{\hat{x}}_2\end{bmatrix} = \begin{bmatrix} -\left(\frac{RR_c(1-D)}{L(R+R_c)} + \frac{R_s}{L}\right) & \frac{R(1-D)}{L(R+R_c)} \\ -\frac{R(1-D)}{C(R+R_c)} & -\frac{1}{C(R+R_c)} \end{bmatrix}\begin{bmatrix}\hat{x}_1 \\ \hat{x}_2\end{bmatrix} + \begin{bmatrix} \frac{RR_c x_{10}}{L(R+R_c)} - \frac{Rx_{20}}{L(R+R_c)} + \frac{u_0}{L} \\ \frac{Rx_{10}}{C(R+R_c)} \end{bmatrix}\hat{d}.$$

Making the following substitutions, which can be derived by letting $\dot{x}_1=0, \dot{x}_2=0, x_1=x_{10}, x_2=x_{20}, R_c=0$, and $R_s=0$ in (61ab):

$$x_{10} = \frac{Du_0}{(1-D)^2 R} \tag{65}$$

and $$x_{20} = -\frac{Du_0}{(1-D)}$$

to get $$\begin{bmatrix} \dot{\hat{x}}_1 \\ \dot{\hat{x}}_2 \end{bmatrix} = \begin{bmatrix} -\left(\frac{RR_c(1-D)}{L(R+R_c)} + \frac{R_s}{L}\right) & \frac{R(1-D)}{L(R+R_c)} \\ \frac{R(1-D)}{C(R+R_c)} & -\frac{1}{C(R+R_c)} \end{bmatrix} \begin{bmatrix} \hat{x}_1 \\ \hat{x}_2 \end{bmatrix} +$$

$$\begin{bmatrix} \frac{Du_0}{(1-D)L}\left(\frac{R_c}{(R+R_c)(1-D)} + \frac{R}{(R+R_c)}\right) + \frac{u_0}{L} \\ \frac{u_0 D}{C(R+R_c)(1-D)^2} \end{bmatrix} \hat{d}$$

$$\hat{y} = \begin{bmatrix} -\frac{RR_c}{R+R_c} & \frac{R}{R+R_c} \end{bmatrix} \hat{x} \tag{66}$$

Now the linear system $$\dot{\hat{x}} = A\hat{x} + B\hat{d}$$

$$\hat{y} = C\hat{x} \tag{67}$$

is provided where A is an n×n matrix, B is an n-column vector, and C is an n-row vector. To find the transfer function the matrix equation is solved $$G_p(s) = C[sI-A]^{-1}B.$$

After some algebra, setting $R_s=0$ and letting powers greater than one of $R_c$ equal zero provides $$G_p(s) = \tag{68}$$

$$-\frac{1}{\Delta(s)} \left\{ \frac{1}{LC(R+R_c)^2} \frac{Du_0}{(1-D)^2} ([LD - RR_cC(1-D)]s + (1-D) \right.$$

$$\left. R[(D^2 - D + 2)R_c + (1-D)R]) \right\}$$

where $\Delta(s)$ is the determinant of $[sI-A]^{-1}$ which is $$\Delta(s) = s^2 + \left(\frac{L + RR_cC(1-D)(R+R_c)}{(R+R_c)^2 LC}\right)s + \tag{69}$$

$$\frac{[RR_c(1-D) + R^2(1-D)^2]}{(R+R_c)^2 LC}$$

Taking the term in (68) associated with s, the zero of the linear approximation of the system should be in the left-half plane, so this term needs to remain positive. Solving for $R_cC$ results in $$R_cC > \frac{LD}{R(1-D)}. \tag{70}$$

At this point, it has been shown that the transfer function of the linear approximation of the nonlinear system has a left-half plane zero under constraint (70). As before, it is known that the zeros of the transfer function of the linear approximation of the nonlinear system at x=0 coincide with the eigenvalues of the linear approximation of the zero dynamics of the nonlinear system at η=0. Therefore, the original nonlinear system (61) has asymptotically stable zero dynamics.

The Proposition is again used, with p(s) as above in equation (46) and the closed loop system as in equation (47). As shown in equation (63), the input d appears after only one differentiation so the relative degree is again one. This means that the present invention is a single order linear system containing only one root, thus the present invention can be expressed in the new coordinates as $$\dot{\xi} = -k\xi + v$$

$$\dot{\eta} = q(\xi,\eta)$$

$$y = \xi.$$

The polynomial p(s) is simply p(s)=s+k, with k>0, so that the denominator is now a real pole in the left half plane.

In accordance with the Proposition, the root of the polynomial p(s) has a negative real part, and as shown above, the present invention has asymptotically stable zero dynamics. Therefore, given a control law of the form (48), it can be concluded that the original nonlinear system (61) is locally asymptotically stable.

The following theorem has been proven.

Theorem 2: For a buck-boost converter with asymptotically stable zero dynamics (using leading-edge modulation), with constraint $$R_cC > \frac{LD}{R(1-D)} \tag{71}$$

and control law $$d = \frac{1}{L_g L_f^{r-1} y}(-L_f^r y - k(y - y_0)); \tag{72}$$

the nonlinear system $$\dot{\xi} = -k\xi + v$$

$$\dot{\eta} = q(\xi,\eta),$$

$$y = \xi \tag{73}$$

with v=0, is asymptotically stable at each equilibrium point (the characteristic polynomial p(s) has a root with negative real part) which means that the original nonlinear system $$\dot{x} = f(x) + g(x)d$$

$$y = h(x) \tag{74}$$

is locally asymptotically stable at each equilibrium point ($x_{10}$, $x_{20}$) in the set $$S = \{(x_1, x_2), x \in \mathfrak{R}^n : x_1 \geq 0, x_2 \leq 0\}$$

with $0 \leq d < 1$.

Recall that ($x_{10}$, $x_{20}$) corresponds to $y_0$ through equation (62).

Theorem 2 indicates local asymptotic stability. In practice, the reference input $y_0$ is ramped up in a so-called "soft-start" mode of operation. This theorem also guarantees local asymptotic stability at each operating point passed through by the system on its way up to the desired operating point.

Figure 11A:
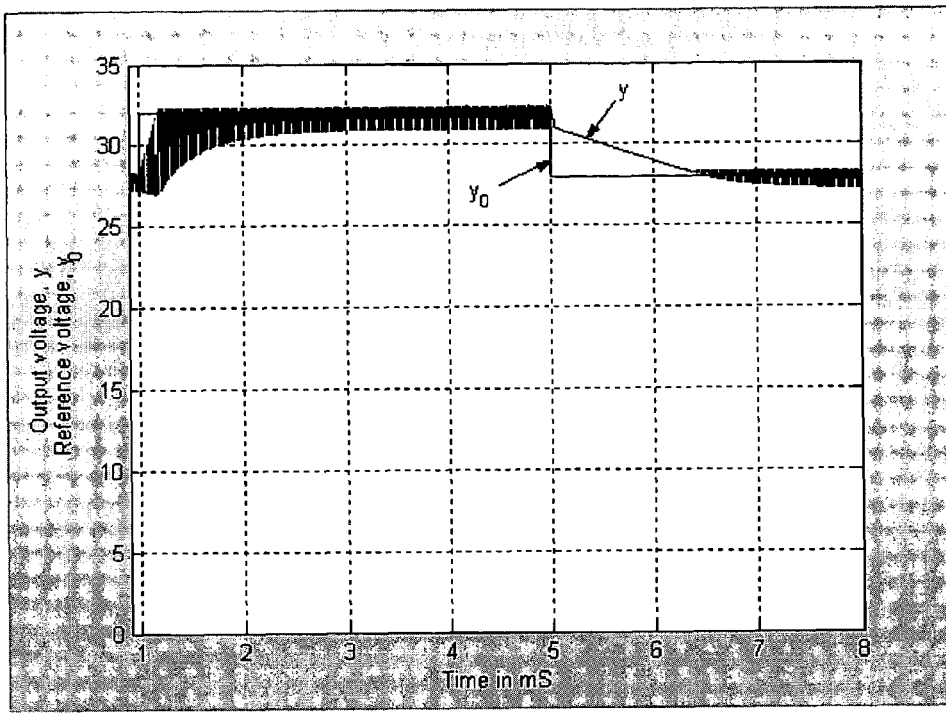
FIG. 11A is a graph of the boost converter output voltage, y, during $y_0$ step from 28V to 32V to 28V in accordance with the present invention.
Figure 11B:
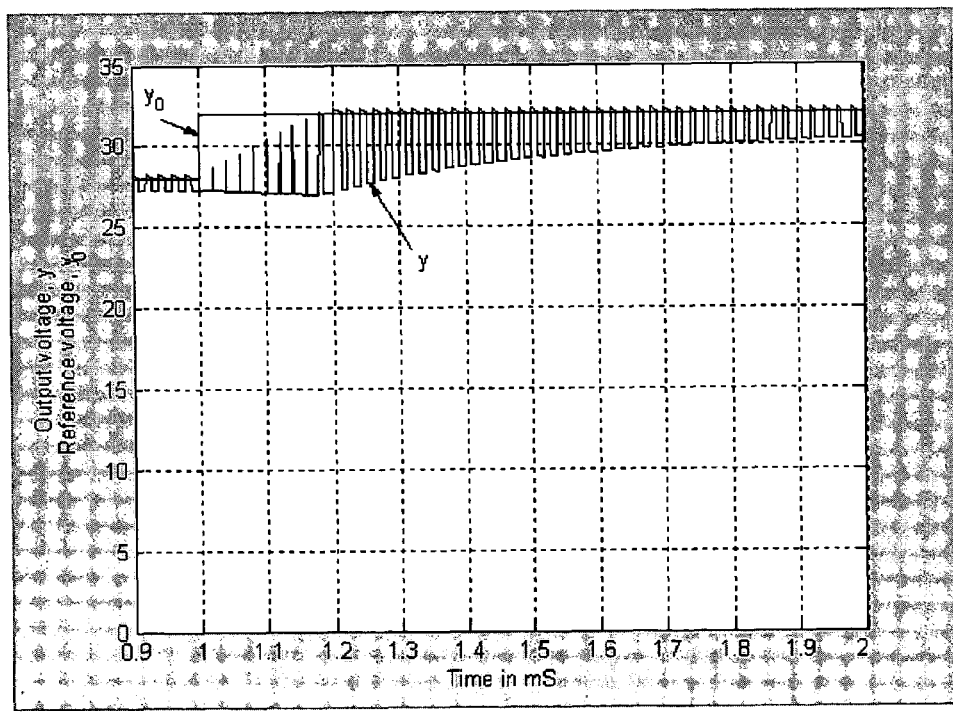
FIG. 11B is a graph of a close up view of the boost converter output voltage transition in FIG. 11A from 28V to 32V in accordance with the present invention.
Figure 12:
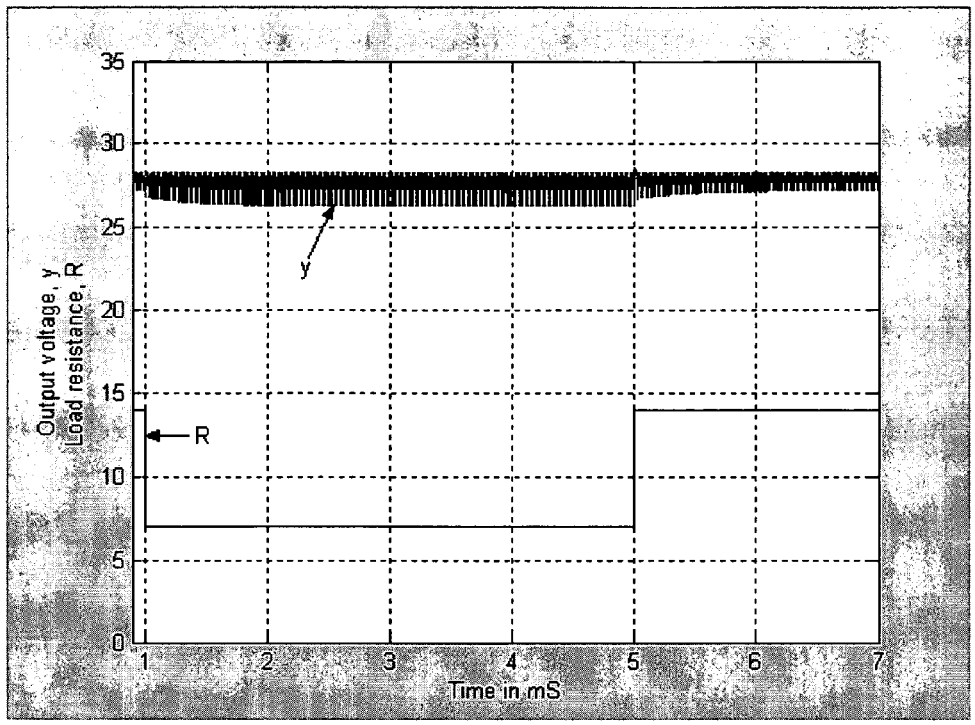
FIG. 12 is a graph of the boost converter output voltage, y, during a step load change from 14Ω to 7Ω to 14Ω in accordance with the present invention.

Now referring to FIGS. 11A, 11B and 12, the boost converter shown in FIG. 5 is simulated using Simulink under a switching regime using input-output feedback linearization and LEM. Two dynamic cases are simulated. In the first case, the operating point voltage, $y_0$, was stepped from 28V to 32V to 28V with k=0.3. The output response appears in FIG. 11A. A closeup of the output voltage transition from 28V to 32V is shown in FIG. 11B. The high switching ripple is due to the value of $R_c$.

In FIG. 11A above, when t=5 mS, the switching turns completely off and the output capacitor is discharged into load R until the output voltage y reaches the desired voltage of 28V which causes the switching to start up again to maintain the regulated output. The close up view in FIG. 11B above shows the RHP zero effect in that the pulse width is commanded to maximum and yet the output voltage drops (see bottom of the ripple waveform). The top of the waveform does not drop and this is the voltage sampled during the interval 1–d giving us the desired effect of moving the RHP zero into the LHP.

In the second case, with $y_0$=28V, the output load R was allowed to change from 14Ω to 7Ω to 14Ω, which results in a load step of 2A to 4A to 2A. The transient response of y resulting from these changes is shown in FIG. 12. In both cases, k is kept at the same value. In addition, slope compensation with a positive slope was added to duty ratio d. Note that slope compensation can be added.

Figure 13:
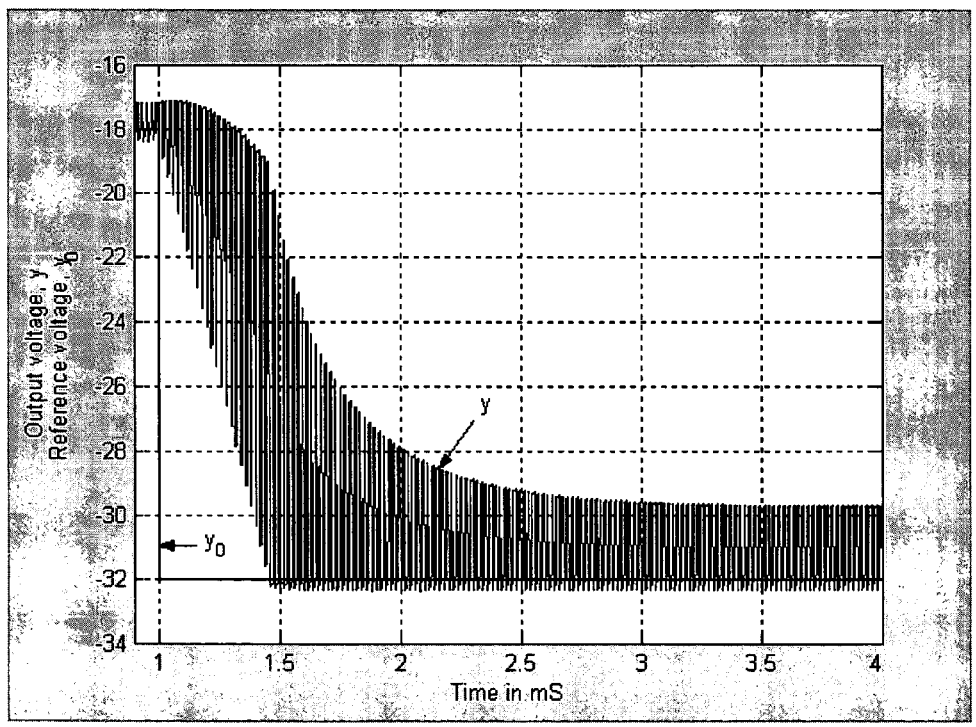
FIG. 13 is a graph of the buck-boost converter output voltage, y, during $y_0$ step from −18V to −32V in accordance with the present invention.
Figure 14:
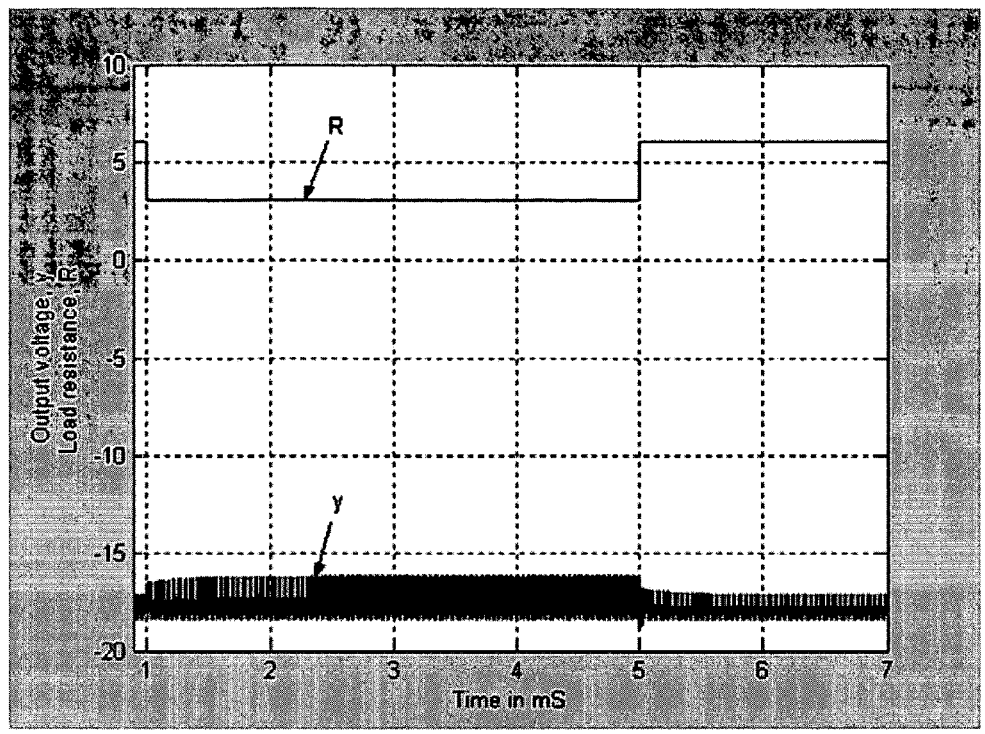
FIG. 14 is a graph of the buck-boost converter output voltage, y, during a step load change from 6Ω to 3Ω to 6Ω in accordance with the present invention.
Figure 15:
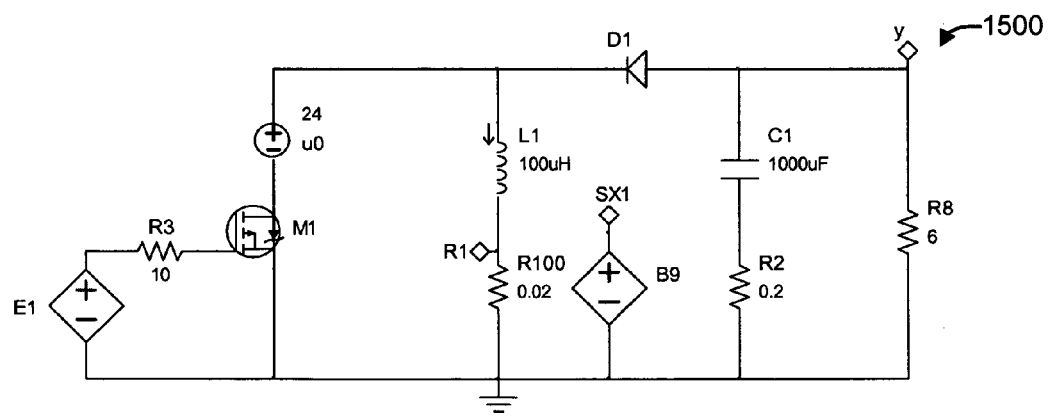
FIG. 15 is a schematic diagram of a buck-boost converter circuit for $y_0$ step in accordance with the present invention.

Referring now to FIGS. 13, 14, 15, the buck-boost converter shown in FIG. 8 is simulated using Simulink under a switching regime using input-output feedback linearization and LEM. Two dynamic cases are simulated. In the first case, the operating point voltage, $y_0$, was stepped from –18V to –32V with k=0.3. The output response appears in FIG. 13. In the second case, with $y_0$=–18V, the output load R was allowed to change from 6Ω to 3Ω to 6Ω, which results in a load step of 3A to 6A to 3A. The transient response of y resulting from these changes is shown in FIG. 14. In both cases, k is kept at the same value. In addition, slope compensation with a positive slope was added to duty ratio d.

The transition from –32V to –18V is not shown in FIG. 13 because the effect is similar to FIG. 11A in that switching turns completely off, and the output capacitor is discharged into load R until the output voltage y reaches the desired voltage of –18V, causing the switching to start up again to maintain the regulated output. The transition during the load step is clean and smooth as seen in FIG. 14.

Input-output feedback linearization will now be applied to the nonlinear state space averaged models of both the boost and buck-boost converters. The analysis will be restricted to the switched regime using a new model called the Discrete Average Model using a switched Spice circuit instead of averaged equations. This new model used the averaged states but the output is sampled at the switching frequency by using leading-edge modulation instead of trailing-edge modulation. In fact, trailing-edge modulation could not be used because of the unstable zero dynamics associated with it during the continuous conduction mode of operation. Using leading-edge modulation, the unstable zero dynamics are moved to stable zero dynamics and establish a new constraint. For DC-DC conversion, equivalent equations (38) and (64) are derived for the duty ratio d that involve only the linear parameter k and any state space operating point ($x_{10}$, $x_{20}$). With this d, the equilibrium point ($x_{10}$, $x_{20}$) is asymptotically stable as shown in Theorems 1 and 2.

Now referring to FIG. 15, a Spice analysis of the buck-boost converter 1500 using input-output linearization with leading-edge modulation will now be described. The two dynamic cases previously done with Simulink were again simulated under the same conditions. The first case is for a step in $y_0$ from –18V to –32V. Only this direction of step is shown since the step from –32V to –18V results in the trivial result of the PWM turning completely off and waiting for the output capacitor to discharge up to –18V.

Figure 16:
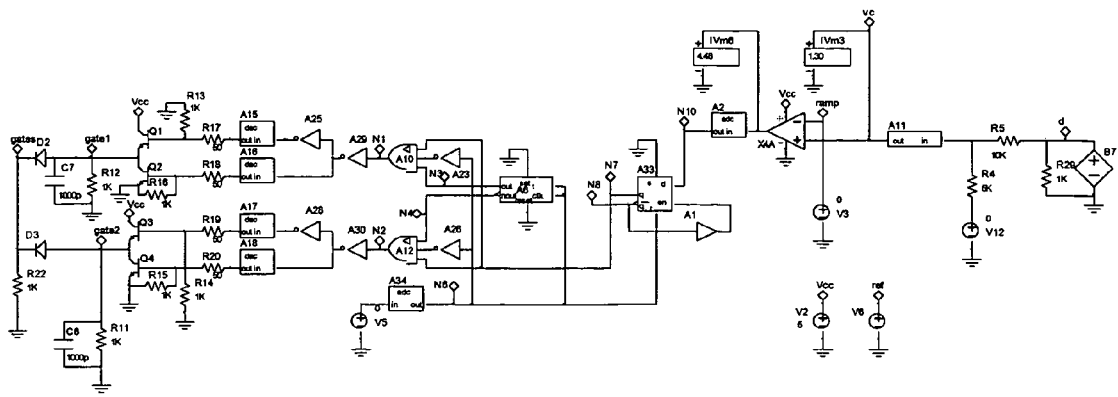
FIG. 16 is an example of a schematic diagram of a control circuit and PWM modulator in accordance with the present invention.
Figure 17:
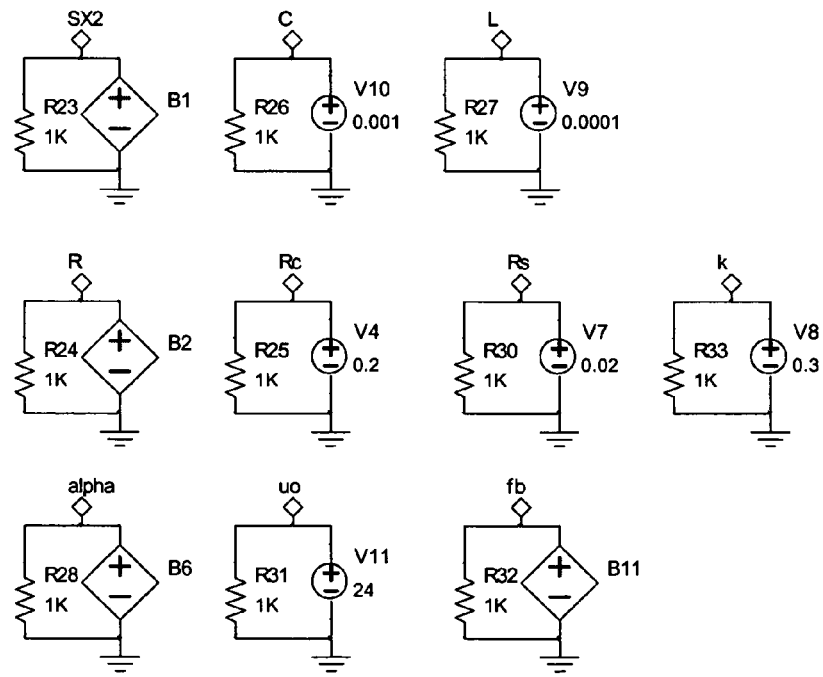
FIG. 17 contains an example of schematic representations of the basic elements for calculation of duty ratio d in accordance with the present invention.

The circuit description for $y_0$ step will now be described. Power switch M1 is a P-channel enhancement mode MOSFET. The model chosen is an IRFP9240. However, in order to closely model the ideal switches used in Simulink, the $R_{ds(on)}$ of M1 was changed to one-tenth of a milliOhm ($10^{-4}$ Ohms). This entailed changing both 'rd' and 'rs' in the model. The function B9 measures $x_1$ through $L_1$. It simply takes the voltage at node $R_1$ and divides it by 0.02. The output voltage y is taken directly from the node labeled y in FIG. 15. The diode D1 is a generic fast recovery diode. The transit time was decreased to simulate a hyperfast recovery diode. This results in lower switching spikes on the output ripple. For example, a PWM modulator is included in the control circuit of FIG. 16, which is included only as an example and is not intended to limit the invention in any way. Those skilled in the art will recognize that FIGS. 16 and 17 represent one specific example and that the specific application and modeling software will dictate the exact schematic diagram necessary to implement the present invention.

The sawtooth ramp with a negative slope (LEM) is generated by element V3 and is connected to the inverting input of the comparator. The comparator model is a MAX907CPA high slew rate device with a low propagation delay. The non-inverting input is connected to the output of a limiter which actually sets the maximum duty ratio. In this example, the maximum duty ratio is set to 0.8. The element B7 actually calculates the control voltage, which is compared against the sawtooth ramp. The calculations are based on the elements shown in FIG. 17, which is included only as an example and is not intended to limit the invention in any way. Element V6 provides the step in the reference $y_0$.

The PWM modulator output steering logic was taken from an application note for the SG1526 PWM IC originally manufactured by Silicon General. The drive transistors were then added to give sufficient current capability to drive the high capacitive load of the MOSFET gate. Lastly, the two channel outputs were diode-or'ed to become a single channel. The resistors R4 and R5 with ramp generator V12 provide slope compensation. The value of $m_c$ here is 1.5. The slope of the ramp generated by V12 is positive which offsets the ramp slope generated by ramp generator V3. The control voltage labeled d in FIG. 16 represents the duty ratio. It is converted to PWM by comparison with the sawtooth ramp.

Figure 18:
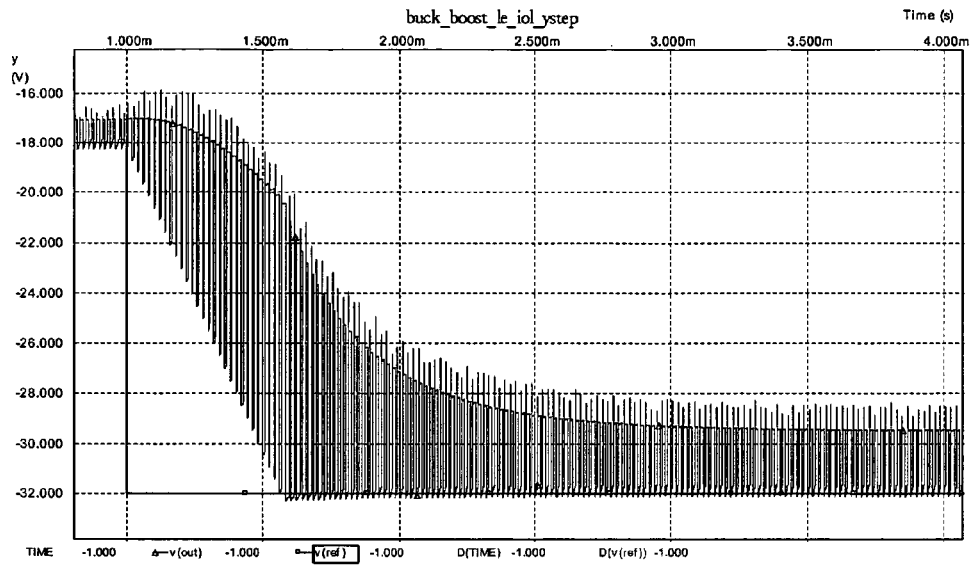
FIG. 18 is a graph of the buck-boost converter output voltage, y, during $y_0$ step from −18V to −32V in accordance with the present invention.

Simulation results for $y_0$ will now be discussed. In the first case, the operating point voltage, $y_0$, is stepped from –18V to –32V with k=0.3. The output response is shown in FIG. 18 wherein y is labeled V(out) and $y_0$ is labeled V(ref). As seen by comparison of FIG. 18 with the Simulink simulation of FIG. 13, the similarity in the response is remarkable. This result justifies the accuracy of the previous models and the use of Simulink in modeling and simulating such switching converters.

A circuit description for R step will now be discussed. The circuit description given above applies here as well with the exception that here the load R was changed whereas $y_0$ was changed before. The load R is changed from 6Ω to 3Ω to 6Ω.

Figure 19:
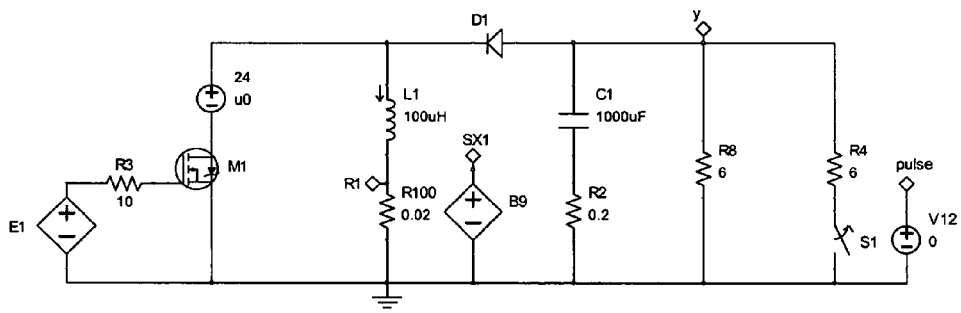
FIG. 19 is a schematic diagram of a buck-boost converter circuit for R step in accordance with the present invention.

This is accomplished with switch $S_1$ as shown in FIG. 19. Switch $S_1$ is pulsed on (closed) for 1 mS by generator V12 at node 'pulse.' The PWM modulator and control are the same as shown in FIG. 16 except that reference voltage V6 is now fixed at −18V. The elements in FIG. 17 remain the same.

Figure 20:
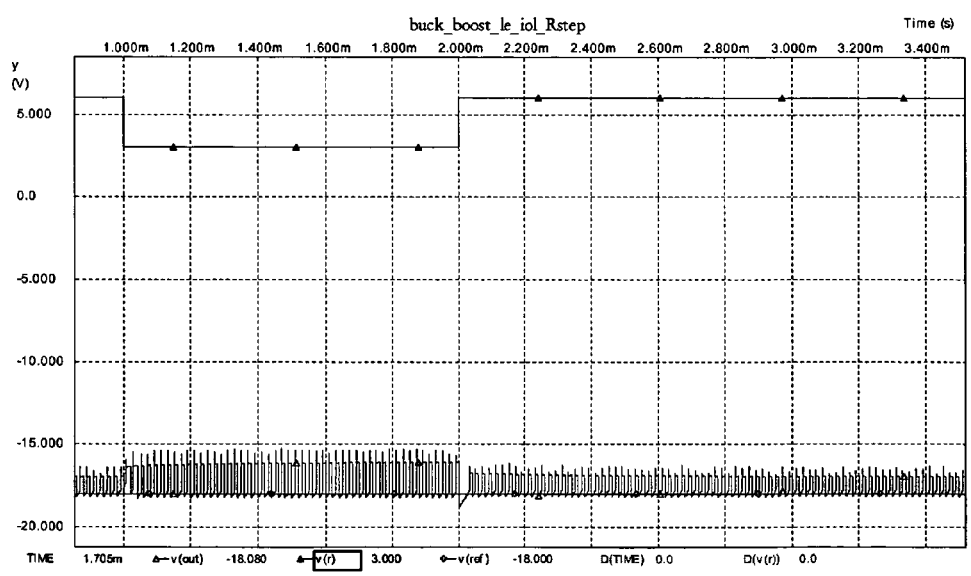
FIG. 20 is graph of the buck-boost converter output voltage, y, during a step load change from 6Ω to 3Ω to 6Ω in accordance with the present invention.

The simulation results for R step will now be discussed. In the second case, the load, R, is stepped from 6Ω to 3Ω to 6Ω with k=0.3. The output response is shown in FIG. 20 wherein y is labeled V(out), $y_0$ is labeled V(ref) and R is labeled V(r). Comparing FIG. 20 with the Simulink simulation of FIG. 14, noticeably similar results can be seen.

REFERENCES

1) S. Ćuk, *Modeling, Analysis, and Design of switching Converters*, Ph.D. Dissertation, California Institute of Technology (1977).
2) R. D. Middlebrook and S. Ćuk, *A general unified approach to modeling switching-converter power stages*, IEEE Power Electronics Specialists Conference Record, June 1976, 18-34.
3) D. M. Mitchell, *DC-DC Switching Regulator Analysis, Reprint Edition*, D. M. Mitchell Consultants, Cedar Rapids, Iowa (1992), McGraw-Hill, Inc. (1988).
4) J. J. E. Slotine and W. Li, *Applied Nonlinear Control*, Prentice-Hall, Inc. (1991).
5) A. Isidori, *Nonlinear Control systems* $3^{rd}$ Ed, Springer-Verlag London Limited (1995).
6) R. Su, *On the linear equivalents of nonlinear systems*, Systems and Control Letters 2, (1982), 48-52.
7) R. Su and L. R. Hunt, *Linear equivalents of nonlinear time-varying systems*, International Symposium on Mathematical Theory of Networks and Systems (1981), 119-123.
8) L. R. Hunt, R. Su, and G. Meyer, *Design for multi-input nonlinear systems*, Differential Geometric Control Theory, Birkhauser, Boston, R. W. Brockett, R. S. Millman, and H. J. Sussman, Eds., (1983), 268-298.
9) L. R. Hunt, R. Su, and G. Meyer, *Global transformations of nonlinear systems*, IEEE Transactions on Automatic Control, 28 (1983), 24-31.
10) G. Meyer, L. R. Hunt, and R. Su, *Applications of nonlinear transformations to automatic flight control*, Automatica, 20 (1984), 103-107.
11) S. R. Sanders, *Nonlinear control of switching power converters*, Ph.D. dissertation, Massachusetts Institute of Technology (1989).
12) H. Sira-Ramirez and M. Ilic-Spong, *Exact linearization in switched mode dc-to-dc power converters*, Int. J. Control, 50 (1989), 511-524.
13) Marc Bodson and John Chiasson, *Differential-geometric methods for control of electric motors*, Int. J. Robust and Nonlinear Control 8, (1998), 923-954.
14) H. Sira-Ramirez, *Switched control of bilinear converters via pseudolinearization*, IEEE Transactions on Circuits and Systems, VOL 36, NO. 6, (1989).
15) R. Su, G. Meyer, and L. R. Hunt, *Robustness in nonlinear control*, Differential Geometric Control Theory, Birkhauser, Boston, R. W. Brockeft, R. S. Millman, and H. J. Sussman, Eds., (1983), 316-337.
16) Dan M. Sable, Bo H. Cho, Ray B. Ridley, *Elimination of the positive zero in fixed frequency boost and fly back converters*, Proceedings of 5th IEEE Applied Power Electronics Conference, (1990), 205-211.
17) Daniel J. Shortt, *An Improved Switching Converter Model*, Ph.D. Dissertation, Virginia Polytechnic Institute and State University (1982).
18) C. W. Deisch, *"Simple switching control method changes power converter into a current source,"* IEEE Power Electronics Specialists Conference, 1978 Record, pp. 300-306.
19) Raymond B. Ridley, *A New Small-Signal Model For Current-Mode Control*, Ph. D. Dissertation, Virginia Polytechnic Institute and State University (1990).
20) Bruce L. Wilkinson and Josh Mandelcom, *"Unity power factor power supply,"* Pioneer Research, Inc. U.S. Pat. No. 4,677,366.
21) Wei Tang, *"Average Current-Mode Control and Charge Control For PWM Converters,"* Ph. D. Dissertation, Virginia Polytechnic Institute and State University (1994).

Although preferred embodiments of the present invention have been described in detail, it will be understood by those skilled in the art that various modifications can be made therein without departing from the spirit and scope of the invention as set forth in the appended claims.

We claim:

1. A method for controlling a non-linear system using a PWM modulator/controller comprising the steps of:
   receiving a first voltage from an output of a converter, a second voltage from a reference voltage source, a first current from an inductor within the converter and a second current from a reference current source at the PWM modulator/controller;
   creating a third voltage representing a difference between the first voltage from the output of the converter and the second voltage from the reference voltage source;
   adjusting the third voltage by a proportional gain;
   creating a control signal that provides leading-edge modulation with input-output linearization based on the second voltage from the reference voltage source, the adjusted third voltage, the first current from the inductor within the converter and the second current from the reference current source; and
   controlling the non-linear system using the control signal created by the PWM modulator/controller.

2. The method as recited in claim 1, wherein the non-linear system is a boost converter or a buck-boost converter.

3. The method as recited in claim 1, wherein the non-linear system is a boost converter and a duty cycle for the control signal is defined as $$d = -\frac{[CR_sR_c(R+R_c) + L(R+R_c)]x_1 + [(R+R_c)R_cC + L]\frac{(R+R_c)}{R}y - (R+R_c)R_cCu_0 - k(y-y_0)}{LRx_1 + [(R+R_c)R_cC]\frac{(R+R_c)}{R}y}.$$

4. The method as recited in claim 1, wherein the non-linear system is a buck-boost converter and a duty cycle for the control signal is defined as $$d = -\frac{y - [(R+R_c)R_cR_sC - L(R+R_c)]x_1 + k(y-y_0)}{(R+R_c)R_cCy + LRx_1 - (R+R_c)R_cCu_0}.$$

5. The method as recited in claim 1, wherein the control signal provides leading-edge modulation with input-output linearization.

6. The method as recited in claim 1, wherein the control of the non-linear system cannot be unstable.

7. The method as recited in claim 1, wherein the control signal is created using a first order system.

8. The method as recited in claim 1, wherein the control signal is independent of a stabilizing gain, a desired output voltage or a desired output trajectory.

9. A converter controlled in accordance with the method of claim 1.

10. A system comprising:
a converter having a first voltage at an output of the converter and a first current at an inductor within the converter;
a reference voltage source having a second voltage;
a reference current source having a second current; and
a PWM modulator/controller comprising:
a summing circuit connected to the converter and the reference voltage source to create a third voltage representing a difference between the first voltage from the output of the converter and the second voltage from the reference voltage source,
a gain circuit connected to the summing circuit to adjust the third voltage by a proportional gain, and
a modulating circuit connected to the gain circuit, the converter, the reference voltage source and the reference current source to create a control signal to control the converter, wherein the control signal provides leading-edge modulation with input-output linearization that is based on the second voltage from the reference voltage source, the adjusted third voltage from the gain circuit, the first current from the inductor within the converter and the second current from the reference current source.

11. The system as recited in claim 10, wherein the second voltage source and second current source are integrated into the PWM modulator/controller.

12. The system as recited in claim 10, wherein the PWM modulator/controller is implemented using a digital signal processor or conventional electrical circuitry.

13. The system as recited in claim 10, wherein the control signal controls a boost converter or a buck-boost converter.

14. The system as recited in claim 10, wherein the control signal controls a boost converter and has a duty cycle defined as $$d = -\frac{[CR_sR_c(R+R_c) + L(R+R_c)]x_1 + [(R+R_c)R_cC + L]\frac{(R+R_c)}{R}y - (R+R_c)R_cCu_0 - k(y-y_0)}{LRx_1 + [(R+R_c)R_cC]\frac{(R+R_c)}{R}y}.$$

15. The system as recited in claim 10, wherein the control signal controls a buck-boost converter and has a duty cycle defined as $$d = -\frac{y - [(R+R_c)R_cR_sC - L(R+R_c)]x_1 + k(y-y_0)}{(R+R_c)R_cCy + LRx_1 - (R+R_c)R_cCu_0} \cdot [RR_cC + L]\frac{(R+R_c)}{R}.$$

16. A kit for a PWM modulated converter comprising;
a digital signal processor comprising:
a first connection to receive a first voltage from an output of the converter,
a second connection to receive a second voltage from a reference voltage source,
a third connection to receive a first current from an inductor within the converter,
a fourth connection to receive a second current from a reference current source,
a fifth connection to output a control signal to the converter,
a summing circuit connected to the first connection and the second connection to create a third voltage representing a difference between the first voltage from the output of the converter and the second voltage from the reference voltage source,
a gain circuit connected to the summing circuit to adjust the third voltage by a proportional gain, and
a PWM modulating circuit connected to the gain circuit, the second connection, the third connection, the fourth connection and the fifth connection, the modulation circuit creating the control signal that provides leading-edge modulation with input-output linearization based on the second voltage from the reference voltage source, the adjusted third voltage from the gain circuit, the first current from the inductor within the converter and the second current from the reference current source; and
a computer program embodied on a computer readable medium for programming the digital signal processor to control the PWM modulated converter.

17. The kit as recited in claim 16, wherein the computer program further comprises one or more design tools.

* * * * *

UNITED STATES PATENT AND TRADEMARK OFFICE
CERTIFICATE OF CORRECTION

PATENT NO. : 7,482,794 B2  Page 1 of 2
APPLICATION NO. : 11/039167
DATED : January 27, 2009
INVENTOR(S) : Louis R. Hunt and Robert J. Taylor It is certified that error appears in the above-identified patent and that said Letters Patent is hereby corrected as shown below:

Col. 1, Line 61
Replace "mode (CCM) prevent" with --mode (CCM) prevents--

Col. 10, Eq. (15)
Replace

" $\exists \Omega \subset \mathfrak{R}^n \; \mathfrak{R}_z = T(x): \Omega \to \mathfrak{R}^n$ and $\exists v = \alpha(x) + \beta(x)u, \beta(x) \neq 0$ (15) "

with

-- $\exists \Omega \subset \mathfrak{R}^n \ni z = T(x): \Omega \to \mathfrak{R}^n$ and $\exists v = \alpha(x) + \beta(x)u, \beta(x)u \neq 0$ (15) --

Col. 16, Line 55
Replace

" $$\begin{bmatrix} \dot{x}_1 \\ \dot{x}_2 \end{bmatrix} = \begin{bmatrix} -\left(\dfrac{RR_c(1-D)}{L(R+R_c)} + \dfrac{R_s}{L}\right) & -\dfrac{(1-D)R}{L(R+R_c)} \\ \dfrac{R(1-D)}{C(R+R_c)} & -\dfrac{1}{C(R+R_c)} \end{bmatrix} \begin{bmatrix} \dot{x}_1 \\ \dot{x}_2 \end{bmatrix} + \begin{bmatrix} \dfrac{RR_c x_{10} + R x_{20}}{L(R+R_c)} \\ \dfrac{R x_{10}}{C(R+R_c)} \end{bmatrix} \hat{d}.$$ "

with

-- $$\begin{bmatrix} \dot{x}_1 \\ \dot{x}_2 \end{bmatrix} = \begin{bmatrix} -\left(\dfrac{RR_c(1-D)}{L(R+R_c)} + \dfrac{R_s}{L}\right) & -\dfrac{(1-D)R}{L(R+R_c)} \\ \dfrac{R(1-D)}{C(R+R_c)} & -\dfrac{1}{C(R+R_c)} \end{bmatrix} \begin{bmatrix} \dot{x}_1 \\ \dot{x}_2 \end{bmatrix} + \begin{bmatrix} \dfrac{RR_c x_{10} + R x_{20}}{L(R+R_c)} \\ -\dfrac{R x_{10}}{C(R+R_c)} \end{bmatrix} \hat{d}.$$ --

UNITED STATES PATENT AND TRADEMARK OFFICE
CERTIFICATE OF CORRECTION

PATENT NO. : 7,482,794 B2
APPLICATION NO. : 11/039167
DATED : January 27, 2009
INVENTOR(S) : Louis R. Hunt and Robert J. Taylor Page 2 of 2

It is certified that error appears in the above-identified patent and that said Letters Patent is hereby corrected as shown below:

Col. 23, Line 10-15, Eq. (65)
Replace

"
$$\begin{bmatrix} \dot{x}_1 \\ \dot{x}_2 \end{bmatrix} = \begin{bmatrix} -\left(\frac{RR_c(1-D)}{L(R+R_c)} + \frac{R_s}{L}\right) & \frac{R(1-D)}{L(R+R_c)} \\ \frac{R(1-D)}{C(R+R_c)} & -\frac{1}{C(R+R_c)} \end{bmatrix} \begin{bmatrix} \hat{x}_1 \\ \hat{x}_2 \end{bmatrix} + \begin{bmatrix} \frac{Du_o}{(1-D)L}\left(\frac{R_c}{(R+R_c)(1-D)} + \frac{R}{(R+R_c)}\right) + \frac{u_o}{L} \\ \frac{u_o D}{C(R+R_c)(1-D)^2} \end{bmatrix} \hat{d}$$
"

with $$\begin{bmatrix} \dot{x}_1 \\ \dot{x}_2 \end{bmatrix} = \begin{bmatrix} -\left(\frac{RR_c(1-D)}{L(R+R_c)} + \frac{R_s}{L}\right) & \frac{R(1-D)}{L(R+R_c)} \\ -\frac{R(1-D)}{C(R+R_c)} & -\frac{1}{C(R+R_c)} \end{bmatrix} \begin{bmatrix} \hat{x}_1 \\ \hat{x}_2 \end{bmatrix} + \begin{bmatrix} \frac{Du_0}{(1-D)L}\left(\frac{R_c}{(R+R_c)(1-D)} + \frac{R}{(R+R_c)}\right) + \frac{u_0}{L} \\ \frac{u_0 D}{C(R+R_c)(1-D)^2} \end{bmatrix} \hat{d}$$

Signed and Sealed this

Second Day of June, 2009

JOHN DOLL
*Acting Director of the United States Patent and Trademark Office*